US006718066B1

(12) United States Patent
Shen et al.

(10) Patent No.: US 6,718,066 B1
(45) Date of Patent: Apr. 6, 2004

(54) METHOD AND APPARATUS FOR CODING AN IMAGE OBJECT OF ARBITRARY SHAPE

(75) Inventors: Guobin Shen, Kowloon (HK); Bing Zeng, Kowloon (HK); Ming Liou, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 519 days.

(21) Appl. No.: 09/637,883

(22) Filed: Aug. 14, 2000

(51) Int. Cl.[7] .............................. G06K 9/36; G06K 9/46; G06K 9/34
(52) U.S. Cl. ................... 382/243; 382/248; 382/232; 382/250; 382/173
(58) Field of Search ................... 382/173, 232, 382/243, 248, 250, 251, 253, 276, 280, 281, 303; 348/402.1, 403.1, 404.1; 375/240.03, 240.08, 240.09, 240.16, 240.18, 240.24, 240.22, 240.2

(56) References Cited

U.S. PATENT DOCUMENTS

| | | | | |
|---|---|---|---|---|
| 4,742,552 A | * | 5/1988 | Andrews | 382/303 |
| 5,422,963 A | | 6/1995 | Chen et al. | 382/232 |
| 5,666,212 A | | 9/1997 | Gilge | 382/243 |
| 5,734,755 A | * | 3/1998 | Ramchandran et al. | 382/250 |
| 5,946,419 A | * | 8/1999 | Chen et al. | 382/243 |
| 5,949,919 A | | 9/1999 | Chen | 382/276 |
| 5,959,673 A | * | 9/1999 | Lee et al. | 375/240.16 |
| 5,990,956 A | | 11/1999 | Lee | 348/404.1 |
| 6,037,988 A | * | 3/2000 | Gu et al. | 375/240.16 |
| 6,233,279 B1 | * | 5/2001 | Boon | 375/240.08 |
| 6,356,587 B1 | * | 3/2002 | Choi | 375/240 |
| 6,483,874 B1 | * | 11/2002 | Panusopone et al. | 375/240.08 |
| 6,516,094 B1 | * | 2/2003 | Takahashi et al. | 382/243 |

* cited by examiner

*Primary Examiner*—Andrew W. Johns
*Assistant Examiner*—Amir Alavi
(74) *Attorney, Agent, or Firm*—Burns, Doane, Swecker & Mathis, L.L.P.

(57) ABSTRACT

It is known to represent a square block of an image which has a maximum horizontal or vertical extension N as N vectors each representing one column or row, and encode it using an N×N discrete cosine transform matrix. We introduce a technique which transforms an input vector, or array, representing a portion of an arbitrarily-shaped object block in which the maximum horizontal or vertical extension is at most N, by adding to it additional padding elements, to produce a vector or array which can be encoded using an N×N discrete cosine transform. The padding maximises the number of transformed elements which are zero. We propose encoding arbitrarily-shaped objects based on this padding technique.

20 Claims, 15 Drawing Sheets

METHOD AND APPARATUS FOR CODING AN IMAGE OBJECT OF ARBITRARY SHAPE

FIELD OF THE INVENTION

The present invention relates to methods and apparatus for padding one or more input vectors, or a data array, representing an image object by adding components to it, to generate vector(s) or an array which can be encoded using a transform, such as a discrete cosine transform (DCT). The invention further relates to methods and apparatus for encoding the image object using the transformed vector(s) or array.

BACKGROUND OF THE INVENTION

In various application, a video signal is transmitted in a digital form. In many such applications the available bandwidth is limited, so some form of compression is required. In response to this requirement, various video compression standards or processes have been established, including MPEG-1, MPEG-2, H.26X and MPEG-4. For example, the MPEG-4 video compression process extends conventional block-based video codecs (e.g., H.263 and MPEG-2) to object-based coding of segmented video objects (VOs).

Such standard techniques include the transmission of still images. One of the most frequently used coding techniques for compression of a image is a DCT-based block transform coding, which converts a block of digital image data (for example a block of 8×8 pixels) into a set of transform coefficients. Thus, the original image is converted into such blocks, and each block is subject to the DCT transform, and the transformed block is compressed (normally by a process which involves quantization of each transformed coefficient). The DCT provides a good compromise between the energy packing ability and computational complexity.

The DCT transform matrix can be written as:

$$C = [c(p,q)]_{N \times N}$$

with:

$$c(p, q) = \sqrt{\frac{2}{N}} c_p \cos \frac{p(2q+1)\pi}{2N} \quad (1)$$

where N is the number of pixels along each side of the N×N block, and p,q=0, ..., N−1. Here, $c_p = \sqrt{1/2}$ if p=0 and $c_p=1$ otherwise.

One advantageous feature of the MPEG-4 video compression standard is the ability to encode arbitrarily-shaped video objects (VOs). The separation of video contents into segments or objects has become an emerging key technique for improving the video quality in (very) low bit-rate applications. By transmission of object or segment contour information, annoying coding errors inherent of block-oriented hybrid DPCM/DCT coding schemes (DPCM stands for Differential Pulse Coded Modulation. In most video coding standard, the DC component of a transformed block is usually coded with a DPCM technique), such as mosquito noise and blocking artefacts, can be avoided to a certain extent, or sometimes to a great extent.

An efficient DCT is desirable for coding objects (note that the term "object" is used herein to refer also to a single segment of a larger object, e.g. a segment of an image) of arbitrary shapes. Generally, an object may contain a number of complete blocks (which may be coded using conventional DCT) and a number of blocks consisting of both pixels which are in the object and pixels which are not. The latter type of blocks often provide the boundary for the object, and accordingly they are sometimes referred to as boundary blocks. The object pixels in the boundary blocks may be at any positions within the blocks, and thus the set of object pixels may be of any shape. Computationally complex shape-adaptive DCT (SA-DCT) algorithms have been proposed in the literature, either based on the calculation of shape-adaptive orthogonal sets of DCT basis functions, for example see U.S. Pat. No. 5,666,212, or based on a DCT coefficient zeroing (H. H. Chen, M. R. Civanlar, and B. G. Haskell, "A block transform coder for arbitrarily-shaped image segments", Proc. Int. Conf. on Image Processing (ICIP), vol. 1, 1994, pp. 85–89). While the former method relies on expensive calculation of DCT basis functions for every different segment shape, the latter one employs the normal N×N DCT (N=8 typically) with additional numerical optimisation so as to minimise the number of DCT coefficients to be coded. A more efficient algorithm is proposed in (T. Sikora, "Low complexity shape-adaptive DCT for coding of arbitrarily shaped image segments", Signal Processing: Image Communication, vol. 7, no. 4–6, Nov. 1995, pp. 381–395; and P. Kauff and K. Schuur, "Shape-adaptive DCT with block-based DC separation and Δ-DC correction"). This algorithm is here denoted as the standard SA-DCT hereafter, based on some pre-defined sets of separable DCT basis functions. A given row (or column) of the block is transformed using a DCT matrix corresponding generally to equation (1) but in which the order of the DCT matrix is not N, but instead is a value K, which is the number of object pixels in the row (or column). In other words, a different transformation matrix is used for each value of K. Standard SA-DCT can be viewed as an approximation of the method outlined in see U.S. Pat. No. 5,666,212. One important feature of the standard SA-DCT is that it results in exactly the same number of non-zero transformed coefficients as the number of pixels within the original input data block (of an arbitrary shape). Furthermore, after SA-DCT, the coefficients are generally located at the low frequency corner, and are thus quite desirable for the subsequent processing such as zig-zag scan and non-uniform quantization. Note that there are some DCT-domain positions undefined by the standard SA-DCT. A modified shape-adaptive zig-zag scan method which skips these un-defined positions (if necessary) is adopted in the framework of the MPEG-4 verification model to increase the coding efficiency.

A disadvantage of standard SA-DCT is that since standard SA-DCT employs not just an 8×8 DCT matrix, but also DCT matrices for each value of K, it cannot be implemented using known chipsets which implement 8×8 DCT in a highly efficient manner.

It is clear that to employ eqn. (1) directly, an N×N image block has to be fully defined before the transform can take place. However, since for all boundary blocks, only part of an N×N block belongs to the object, some kind of padding has to be performed so as to pad an arbitrary shape back to the normal block of size N×N.

Intuitively, the simplest padding technique is perhaps to repeat the boundary pixels to fill all undefined positions. In the MPEG-4 video standards, a sophisticated padding scheme has been developed. This scheme is basically a low-pass extrapolation (LPE), performed in three steps as summarized in T. Ebrahimi, "MPEG-4 video verification model version 11.0", ISO/IEC JTC1/SC29WG11, MPEG98/N2172, March 1998, Tokyo:

1. Calculate the arithmetic mean value m of all block pixels situated within the object region.
2. Assign m to each block pixel outside the object region.
3. Apply the following transform to each block pixel outside the object region in a recursive manner, starting from the top-left of the block and proceeding row by row to the bottom.

$$\tilde{f}(i, j) = \frac{f(i-1, j) + f(i, j-1) + f(i, j+1) + f(i+1, j)}{2} \quad (2)$$

In Step 3, if one or more pixels used for filtering are outside the block, the corresponding pixels are not included into the filtering operation and the divisor 4 is reduced accordingly.

Another padding method has recently been proposed in J.-W. Yi, S.-J. Cho, W.-J. Kim, S.-D. Kim, and S.-J. Lee, "A new coding algorithm for arbitrarily shaped image segments", Signal Processing: Image Communication, vol. 12, no. 3, June, 1998, pp. 231–242. It is based on an extension-interpolation (EI) scheme and is thus denoted here as the EI method.

The idea is as follows: (1) A K-point DCT is done for each column or row (of length K) in a boundary block, (2) N–K zeros are added to the rear of the DCT coefficient vector, and (3) an N-point IDCT is performed on the new transformed coefficient vector.

In practice, these three steps can be implemented together via a multiplication matrix of dimension N–K in the pixel domain, as derived in J.-W. Yi, S.-J. Cho, W.-J. Kim, S.-D. Kim, and S.-J. Lee, "A new coding algorithm for arbitrarily shaped image segments", Signal Processing: Image Communication, vol. 12, no. 3, June, 1998, pp. 231–242.

Since human visual system is not as sensitive to high frequency details as to low frequency components, it is known to increase the quantization step-size from low frequency positions to high frequency positions.

Unlike SA-DCT, the LPE scheme adopted in MPEG-4 will always produce $N^2$ DCT coefficients, which are generally non-zero before quantization, for each padded data block (of size N×N). Similarly, the number of non-zero transformed coefficients generated in the EI method will also be greater than the number of pixels within the original pixel block. This is undesirable: the data set has been expanded after DCT, leading to large reconstruction errors if big quantization steps are used to force some of the high frequency components to be zero, or high bit rate if fine quantization steps are used to keep the reconstruction error small.

SUMMARY OF THE INVENTION

The present invention aims to provide a new and useful technique for padding data which represents at least a portion of an image object to generate a data set which can be transformed using an N×N array, where N is a power of 2.

The present invention aims to provide a transform of an arbitrarily-shaped object using a normal N×N DCT array, where N is a power of 2. This makes it possible to implement the invention using presently available DCT chipsets, instead of having to design specific ICs as in the standard SA-DCT algorithm.

The present invention further aims to provide a padding technique which guarantees that the number of non-zero transformed elements after N×N DCT is equal to the number of pixels belonging to the original boundary block (of an arbitrary shape). In other words, a sufficient number of DCT-domain positions will be guaranteed to have zero as their transformed elements.

In general terms, the present invention proposes that an input vector having K elements representing K pixels of an object (normally, K object pixels in a row or column of a boundary block) is padded with (N–K) padding elements to form a padded vector. The padding elements are selected such that the result of transforming the padded vector according to a predetermined N×N DCT is a transformed vector having at least (N–K) parameters which are zero.

When the padded vector is subsequently quantized for transmission, the elements of the transformed vector which are zero contribute no quantization errors, no matter how large the quantization steps are.

The parameters which are zero are preferably in locations in the transformed vector which represent the high-frequency components.

The transformed vector is transmitted together with information identifying the locations of the object pixels represented by the input vector within the image. Thus, the original shape can be recovered at the decoder side.

Optionally, the positions of the padding elements within the padded vector may be determined according to the value of K, so as to improve the efficiency of the subsequent coding.

As mentioned, the input vector is normally a row (or column) of the boundary block, so that the transform of the padded vector represents a horizontal (or vertical) transform of the boundary block. A row (or column) of the boundary block which contains N object pixels requires no padding. A row (or column) of the boundary block which contains no object pixels is not used to generate a padding vector. A subsequent transform is then performed in the orthogonal direction.

The method may use respective predetermined criteria to determine: (1) whether the method of the invention is first applied to columns or rows of the boundary block; and (2) whether the padding (if any) in the second direction is applied before or after the transform in the first direction has been applied.

Alternatively, rather than treating the boundary block as a set of vectors, it may be treated as a matrix, and the padding technique applied directly in a single step.

As pointed out above, since standard SA-DCT employs not just an 8×8 DCT matrix, but also DCT matrices for each value of K, it cannot be implemented using known chipsets which implement 8×8 DCT in a highly efficient manner. By contrast, the present invention can be performed using a known chipset since it uses only an 8×8 DCT. It is true that to produce the padding elements a calculation is required, and this would usually require a new chipset, but the degree of computation required to compute the padding elements may be much less (in terms of both the number of multiplications and of additions), and therefore is easier to design. By constrast designing DCT hardware is very complicated, especially when fast algorithms are to be used.

A further advantage of the present method is that it has a nice asymmetric property between the encoder and the decoder, in that the calculation of the padding vector occurs only in the encoder, and thus no new hardware is required in the decoder. In most applications, the decoder usually has a much larger (consumer) market.

A further advantage of the present invention is that it that embodiments of it which are implemented using firmware (software dedicated to some special processors (such as DSP, IC, etc)) are preferable to standard SA-DCT.

The present invention may equivalently be expressed as a method, or as apparatus arranged to perform the method.

BRIEF DESCRIPTION OF THE FIGURES

Embodiments of the invention will now be described for the sake of example only with reference to the following figures, in which.

DETAILED DESCRIPTION OF THE EMBODIMENTS

I. Introduction

Figure 1:
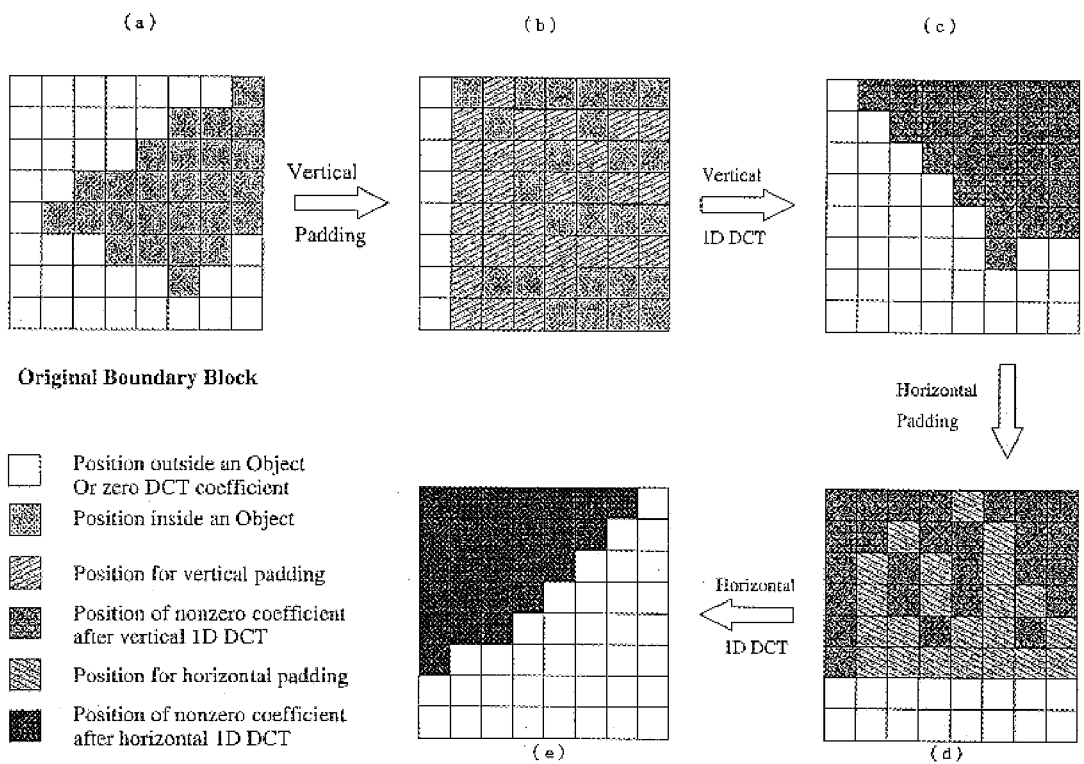
FIGS. 1(a)–(e) illustrate boundary block padding and DCT operations.

In the following three sections, we will, respectively, present the principle of our new padding technique; explain how to apply the new padding technique to achieve arbitrarily-shaped DCT coding; and analyse the computational complexity of the proposed arbitrarily-shaped coding algorithm, as compared against three existing algorithms that have been used in applications, namely, the standard SA-DCT, the LPE scheme suggested in MPEG-4, and the EI method. Some simulation results are reported in Section V, which indicate the comparability of our algorithm with the SA-DCT and EI algorithms in terms of the rate-distortion performance. Finally, some conclusions are drawn in Section VI.

II. New Padding Technique: The Principle

The normal N×N 2-D DCT can be decomposed to row and column base-N 1-D DCT since the basis functions are separable. Actually, such a row-column decomposition has provided a very effective way to implement the 2-D DCT. Initially, we present the 1-D case in this section and will extend the results to the 2-D case in the next section.

As mentioned above, the human visual system is less sensitive to high frequency components than to low frequency components. This means that changes in high frequency components are less visible. Consequently, when we do the padding as described above, we propose make the transformed elements at the high frequency end zero so as to better preserve the visual quality. Assume that the input vector has an arbitrary length: $u=[u_0, u_1, \ldots, u_{K-1}]^t$ of dimension K ($1 \leq K \leq N$); while the padding vector of dimension N−K is denoted as $v=[v_0, v_1, \ldots, v_{N-1-K}]^t$. Form the padded vector by concatenating $v^t$ in the rear of $u^t$.

Then, the base-N 1-D DCT operated on the padded vector $[u^t v^t]^t$ can be expressed by the following equation.

$$\begin{bmatrix} u_0 \\ \vdots \\ u_{K-1} \\ v_0 \\ \vdots \\ v_{N-1-K} \end{bmatrix} = \begin{bmatrix} c(0,0) & \ldots & c(0,K-1) & c(0,K) & \ldots & c(0,N-1) \\ \vdots & \ddots & \vdots & \vdots & \ddots & \vdots \\ c(K-1,0) & \ldots & c(K-1,K-1) & c(K-1,K) & \ldots & c(K-1,N-1) \\ c(K,0) & \ldots & c(K,K-1) & c(K,K) & \ldots & c(K,N-1) \\ \vdots & \ddots & \vdots & \vdots & \ddots & \vdots \\ c(N-1,0) & \ldots & c(N-1,K-1) & c(N-1,K) & \ldots & c(N-1,N-1) \end{bmatrix} \begin{bmatrix} u_0 \\ \vdots \\ u_{K-1} \\ v_0 \\ \vdots \\ v_{N-1-K} \end{bmatrix} \quad (3)$$

where the components c(p,q) (p,q=0,1,..., N−1) are defined as before in Eq. (1). No padding is required if K=0 or K=N.

Here, our goal is to force N−K components that locate at the high frequency end, i.e., $v_i$ for all i=0, ..., N−1−K, to be zero. Before we consider the solvability of this problem, let us first study two simple examples.

In the first example, let us assume that the length of u is 1. Then, this padding problem is solvable and the solution is just to repeat the sole pixel value N−1 times. Notice that no computations are needed at all in this case.

In the second example, let us consider an input vector of size 5, $u=[2, 4, 6, 8, 10]^t$, so we need to pad 3 extra values in order to perform the 8-point DCT. If we choose $v=[7.7251, -1.8216, -11.8763]^t$ and then apply the 8-point DCT on the concatenated vector, we obtain:

[8.4949, 8.5505, −15.0866, 6.6025, −2.7506, 0, 0, 0]$^t$.

Clearly, we have achieved the goal, i.e., all three components at the high frequency end are 0. However, the resulting DCT components are not desirable for compression because all the non-zero frequency elements have relatively large magnitudes.

It will be shown later that this result is due to the constraint that the padded vector is formed by concatenating the original vector with the padding vector, i.e. the padding vector always appears at the rear of the input vector.

If we relax this constraint a little bit by, say, allowing the elements of the padding vector to be scattered into the original vector, we can obtain a padded vector which, after DCT, is very desirable for compression. Still consider the same example: if we choose $v=[2.5670, 5.4894, 6.3555]^t$ and form the new vector as [2, 2.5670, 4, 5.4894, 6, 6.3555, 8, 10]$^t$, we will get [15.7020, −6.8860, 0.2763, −1.4990, 0.9076, 0, 0, 0]$^t$ after the 8-point DCT.

We see that there are still 3 zeros at the high frequency end, but the transformed vector now is much more suitable for compression.

Now, we turn to studying the solvability of the problem formulated above. By the following general padding theorem, it is guaranteed that we can achieve our goal.

Theorem 1. Assume that the padding is done by concatenating the padding vector of the rear of the original vector. Then, for any input vector of dimension K, there always exists one and only one padding vector of dimension N−K such that the transform vector after the base-N DCT on the padded vector contains an arbitrarily pre-determined vector of dimension N−K at the high frequency end.

Proof: The base-N DCT always results in a transform vector of dimension N. With reference to Eqn. (3), the base-N DCT can be re-written as follows:

$$\begin{bmatrix} U \\ V \end{bmatrix} = \begin{bmatrix} C_{00} & C_{01} \\ C_{10} & C_{11} \end{bmatrix} \begin{bmatrix} u \\ v \end{bmatrix} \quad (4)$$

where u and U are of dimension K, v and V are of dimension N−K, and $$C_{00} = \begin{bmatrix} c(0,0) & \cdots & c(0, K-1) \\ \vdots & \ddots & \vdots \\ c(K-1, 0) & \cdots & c(K-1, K-1) \end{bmatrix},$$

$$C_{01} = \begin{bmatrix} c(0, K) & \cdots & c(0, N-1) \\ \vdots & \ddots & \vdots \\ c(K-1, K) & \cdots & c(K-1, N-1) \end{bmatrix},$$

$$C_{10} = \begin{bmatrix} c(K, 0) & \cdots & c(K, K-1) \\ \vdots & \ddots & \vdots \\ c(N-1, 0) & \cdots & C(N-1, K-1) \end{bmatrix},$$

$$C_{11} = \begin{bmatrix} c(K, K) & \cdots & c(K, N-1) \\ \vdots & \vdots & \vdots \\ c(N-1, K) & \cdots & c(N-1, N-1) \end{bmatrix}.$$

Which gives us:

$$V = C_{10} \cdot u + C_{11} \cdot v \quad (5)$$

Note that $C_{11}$ is a square sub-matrix taken from the DCT matrix along the diagonal. To show that $C_{11}$ is invertible, it suffices to show that it has non-zero determinant, which is trivial. Then, we can solve Eqn. (5) uniquely as long as V is completely specified, and the solution is:

$$v = C_{11}^{-1}(V - C_{10} \cdot u) \quad (6)$$

One can freely choose V in the above equation. As a special case, setting V=0 will result in the solution we desire.

Although this theorem always holds, the inverse of $C_{11}$ may produce undesirable transform vectors (as demonstrated in the above example), and sometimes even causes numerical problems. As mentioned above, this is because of the constraint that the padding is done by concatenation, i.e., pixels from v are always placed in the rear of u. This problem can be solved by interlacing pixels from u and v according to a pre-defined ordering.

Theorem 2. Assume that the padding is done by interlacing the elements of the padding vector into the original vector according to a pre-defined ordering. Then, for any input vector of dimension K, there always exists one and only one padding vector of dimension N−K such that the transform vector after the base-N DCT on the padded vector contains an arbitrarily pre-determined vector of dimension N−K at N−K arbitrarily-chosen positions, as long as the resulting matrix that corresponds to $C_{11}$ as used above in the proof of Theorem 1 is invertible.

Proof: Assume that u and v are interleaved such that the elements of u are located at positions $\alpha_0, \ldots, \alpha_{K-1}$ and the elements of v are to be located at positions $\beta_0, \ldots, \beta_{N-1-K}$, where $0 \leq \alpha_0, \ldots, \alpha_{K-1} \leq N-1$, and $0 \leq \beta_0, \ldots, \beta_{N-1-K} \leq N-1$. Let us use V to denote the arbitrarily pre-determined transform vector of dimension N−K. In this case the elements of V are supposed to be located at positions $\hat{\beta}_0, \ldots, \hat{\beta}_{N-1-K}$.

By elementary row operations, we can gather all elements of v and V together and put them to positions [K, K+1, ..., N−1] in the padded pixel vector and the transform vector, respectively. According to the matrix multiplication rule, if we perform, on the transform matrix, the same elementary row operations as those on the input vector as well as the same elementary column operations as those on the padded pixel vector, Eqn. (5) still holds, but $C_{10}$ and $C_{11}$ have changed to:

$$C_{10} = \begin{bmatrix} c(\hat{\beta}_0, \alpha_0) & \cdots & c(\hat{\beta}_0, \alpha_{K-1}) \\ \vdots & \ddots & \vdots \\ c(\hat{\beta}_{N-1-k}, \alpha_0) & \cdots & c(\hat{\beta}_{N-1-K}, \alpha_{K-1}) \end{bmatrix} \text{ and}$$

$$C_{11} = \begin{bmatrix} c(\hat{\beta}_0, \beta_0) & \cdots & c(\hat{\beta}_0, \beta_{N-1-K}) \\ \vdots & \ddots & \vdots \\ c(\hat{\beta}_{N-1-k}, \beta_0) & \cdots & c(\hat{\beta}_{N-1-K}, \beta_{N-1-K}) \end{bmatrix}$$

Notice that $C_{00}$ and $C_{01}$ have also changed accordingly.
Finally, substituting the newly obtained $C_{10}$ and $C_{11}$ into Eqn. (6) gives the unique solution.

Notice that this modified $C_{11}$ might not be invertible for some interlacing orderings, leading to severe numerical problems. How to find good/optimal orderings to avoid any numerical problems will be discussed in the next section.

III. Arbitrarily-Shaped DCT Coding Based on the New Padding Technique

There are several ways in which the above algorithm can be improved to achieve arbitrarily-shaped DCT coding. They are: (i) determining a good/optimal interlacing ordering between u and v, (ii) how to extend the 1-D padding technique to the 2-D case, and (iii) which of the column and row directions should be chosen first in the 2-D padding.

A. Determination of Good/Optimal Interlacing Ordering
From Eqn. (6) and letting V=0, we get $$v = -C_{11}^{-1} C_{10} \cdot u = -\frac{1}{det(C_{11})} adj(C_{11}) \cdot C_{10} \cdot u \quad (7)$$

It is thus seen that the solution v is directly controlled by $C_{11}$ and $C_{10}$. Usually the influence of $C_{11}$ is much stronger than that of $C_{10}$, since the inverse of $C_{11}$ is involved which is usually the source of numerical problems.

As a result, we propose searching through all candidate orderings and selecting the best one of the following criteria, namely the largest determinant, the smallest condition number, or the smallest ratio of the maximum to minimum eigen-values of the resulting $C_{11}$.

These three criteria have been tested extensively in our simulations. The results show that they produce nearly the same performance. A common feature shared by these three criteria is that the resulting interlacing orderings depend exclusively on $C_{11}$.

Therefore, these orderings are all universally usable. It is also seen from Eqn. (7) that this choice of interlacing ordering is compatible with the requirement that the resulting vector V equals to zero.

Nevertheless, a drawback of these three criteria is that none of them controls the magnitude of the resulting vector U so as to make the subsequent coding of U to be as effective as possible. In the following, we develop another strategy for determining good interlacing orderings so that this drawback can be avoided.

Based on Eqs. (4) and (6) and again setting V=0, we can derive $$U = K \cdot u \quad (8)$$

where $$K = C_{00} - C_{01} C_{11}^{-1} C_{10} \quad (9)$$

From matrix theory we know that $$\|U\|_p \leq \|K\|_p \cdot \|u\|_p \quad (10)$$

where $\|x\|_p$ denotes the $L_p$-norm of a vector x. The same notation is used here in the case of a matrix rather than a vector. Usually, p takes value 1, 2, or infinity, and we select p=2 in our study as it implicates the energy.

When p=2, Eq. (10) indicates that the energy of the transformed vector U is bounded through the $L_2$-norm of the transform kernel matrix K. As far as the compression efficiency is concerned, we desire that the energy of U to be as small as possible. This thus results in the alternative strategy of interlacing a padding vector v of dimension N–K into the original vector u of dimension K with an interlacing ordering which is determined so that the matrix K (as defined in Eq. (9) has the smallest $L_2$-norm.

From the definition of K, it is clear that making its $L_2$-norm to be smallest has also ensured that $C_{11}$ is well-conditioned. Consequently, no numerical problems will be encountered. Our practical tests show that this strategy works consistently better than the previous three. Therefore, it will be used in all of our simulations that are to be reported in Section V.

Notice that the matrix K selected here is not necessarily optimal in the rate-distortion sense. Our motivation for choosing this is that it can lead to a minimal bit rate. However, the matrix K also affects the magnitude of the coding errors after quantization.

All strategies for selecting an interlacing ordering presented above need a search to find the optimal interlacing ordering. Practically, this search can be done exhaustively: for an original vector u of size K and a padding vector v of size N–K, the total number of interlacing orderings we need to search is the combination number $$\binom{N}{K}.$$

For the typical value N=8, we have done the search off-line according to the strategy outlined above, and the resulting orderings for K=2,3, . . . ,7 are listed in the Appendix while the associated matrix $P = -C_{11}^{-1} C_{10}$ $C_{10}$ is also given for each K. Here, it is worth pointing out that all results given in the Appendix are independent of the input vector u, which implies that they can be used globally by any one in his/her application.

A drawback of the standard SA-DCT is known as the mean weighting defect (see P. Kauff and K. Schuur, "Shape-adaptive DCT with block-based DC separation and δ-DC correction", 1998): the transform of a spatially uniform grey pattern will generate some horizontal or vertical (depending on which dimension is chosen first) AC coefficients. This undesirable phenomenon can be reduced by a low-pass padding technique. It is seen from the Appendix that the summation of any row of every interpolation matrix P is 1. As a result, for a uniform grey pattern (either in the spatial domain or in the DCT domain), Eqn. (6) shows that all padded values are the same as the original data value, thus resulting in another uniform grey pattern (of a bigger size). This implies that the mean weighting defect has been avoided elegantly in our proposed padding technique.

B. Extension to 2-D Padding

Although image data is always 2-D in nature, most of the existing fast DCT algorithms are designed for the 1-D case, while the 2-D transform is obtained through the row-column decomposition, thanks to the separability of the 2-D DCT kernel functions. Therefore, in this extension to the 2-D padding, we also follow this row-column decomposition idea, i.e., the 2-D padding is done in two steps: column-wise 1-D padding as well as row-wise 1-D padding. Either the column or row direction can be chosen first, and a preferred selection will be presented later.

After the padding along the first direction has been completed, we will face a choice: the second directional padding is performed in the pixel domain before computing the column DCTs or afterwards in the DCT domain.

Figure 11:
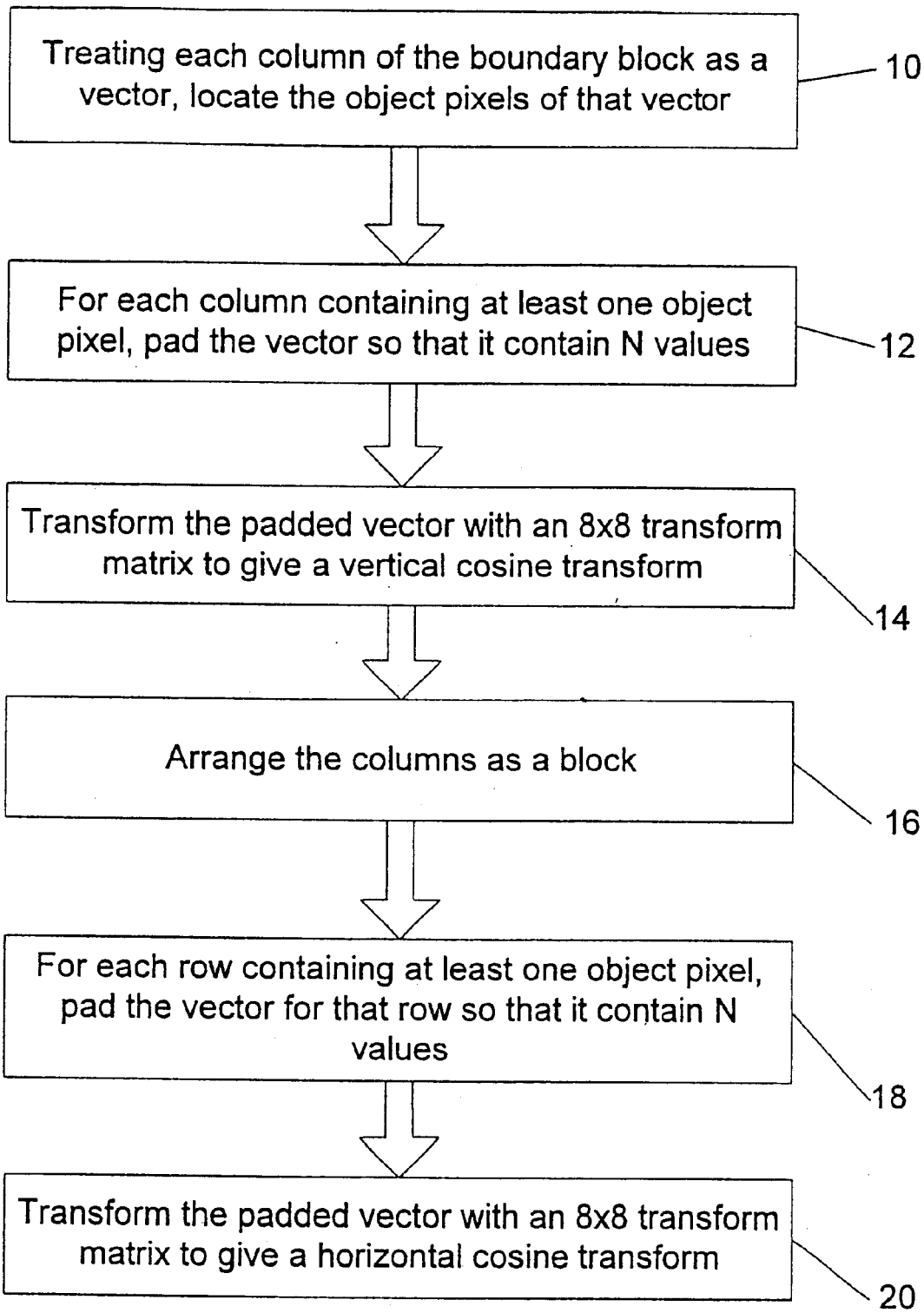
FIG. 11 shows a flow diagram of an embodiment of the invention.

FIG. 1 shows the detailed procedure of the 2-D padding (for N=8) in which the column direction is chosen first and the padding in the second direction is performed in the DCT domain. A corresponding flow diagram is given in FIG. 11. The block to be encoded is shown in FIG. 1(a). In step 10 the object pixels of each column are identified. In step 12 each column containing between 1 and 7 object pixels is padded, to produce the block shown in FIG. 1(b). After the column-wise 1-D DCT on every column (step 14), the number of non-zero elements (in the 8×8 block) is exactly the same as the number of pixels originally belonging to the boundary block (see FIG. 1(c)). The horizontal rows are then considered (step 16), padded (step 18, to produce FIG. 1(d)) and transformed by a row-wise 1-D DCT (step 20, to produce the block of FIG. 1(e)).

Once more, after the row-wise 1-D DCT (step 20), the number of non-zero elements (in the 8×8 block) is exactly the same as the number of pixels originally belonging to the boundary block, as shown in FIG. 1(e). This feature has nicely been preserved after the padding along the row direction and row-wise 1-D DCT on each row. Hence, this approach guarantees that there is no data expansion. On the other hand, however, a possible drawback of this approach is that the processing along the second direction will not be as efficient as the first directional processing—because the transformed elements after the 1-D DCT along the first direction will probably be more highly fluctuating along the second direction.

Completely opposite results will be achieved if we do the second directional padding in the pixel domain (i.e. perform step 18 before step 14). That is to say, if there are still some undefined positions after the padding along the first direction, we will pad along the second direction so as to get a fully-defined N×N matrix (instead of performing the 1-D DCT as in the previous case). Then, the normal N×N 2-D DCT is performed on this fully-defined block.

One advantage of doing this is that the column-wise padding and the row-wise padding are equally efficient. However, the number of non-zero elements after the 2-D DCT on the padded pixel block will be unfortunately greater than the number of pixels originally belonging to the boundary block. Practically, this data expansion problem is very insignificant because (i) it is usually true that the resulting AC coefficients at the high frequency end are very small in magnitude and (ii) any typical quantization will always make a lot of AC coefficients (of high frequencies) zero.

To compare these two different schemes, let us form an 8×8 block with an arbitrary shape as shown in the following matrix (taken from the MPEG-4 video sequence Akiyo):

$$[Pixel]_{8\times 8} = \begin{bmatrix} * & * & * & * & * & * & * & * \\ * & * & * & * & * & * & * & * \\ 31 & * & * & * & * & * & * & * \\ 39 & 40 & 36 & * & * & * & * & * \\ 38 & 38 & 42 & 42 & 32 & * & * & * \\ 36 & 35 & 36 & 40 & 43 & 41 & 36 & * \\ 34 & 34 & 37 & 37 & 38 & 42 & 46 & 46 \\ 35 & 35 & 34 & 34 & 35 & 37 & 37 & 39 \end{bmatrix}$$

in which there are 32 pixels belonging to this boundary block. After the padding and DCT via the two schemes discussed above (where the column direction is chosen first), we obtain the transform coefficient matrices as follows:

$$[DCT1]_{8\times 8} = \begin{bmatrix} 307.80 & -14.80 & 4.55 & -4.01 & -0.81 & 0.81 & 3.18 & -2.64 \\ 14.05 & -1.55 & -0.57 & -3.57 & 1.46 & -1.62 & 0.35 & -4.49 \\ -10.60 & 7.61 & -4.78 & -0.81 & -2.61 & 1.33 & -6.36 & 0 \\ -6.94 & -1.03 & -3.74 & 3.09 & -7.25 & 0 & 0 & 0 \\ -6.40 & 3.19 & -5.62 & 0 & 0 & 0 & 0 & 0 \\ -5.89 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$ and $$[DCT2]_{8\times 8} = \begin{bmatrix} 307.80 & -14.80 & 4.55 & -4.01 & -0.81 & 0.81 & 3.18 & -2.64 \\ 14.05 & -1.55 & -0.57 & -3.57 & 1.46 & -1.62 & 0.35 & -4.49 \\ -9.62 & 4.64 & 0.48 & -5.86 & 1.46 & -4.56 & 2.62 & -7.52 \\ -5.89 & -3.23 & 0.92 & -3.36 & -3.55 & 1.77 & -0.35 & -5.03 \\ -2.59 & -2.64 & -0.50 & 0.86 & 0.26 & -1.69 & -3.08 & -2.44 \\ -0.74 & -1.02 & -0.96 & -0.87 & -0.74 & -0.58 & -0.40 & -0.20 \\ 0 & 0 & 0 & 0 & 0 & 0 & 0 & 0 \\ 0 & 0 & 0 & 0 & 0 & 0 & 0 & 0 \end{bmatrix}$$

It is seen that there are exactly 32 non-zero elements in DCT1 (where the second directional processing is done in the DCT domain), whereas the number of non-zero elements in DCT2 (where the second directional processing is done in the pixel domain) is greater than 32. Now, let's use JPEG (with Q=1.0) to encode DCT1 and DCT2. Then, one will find that 20 and 13 bits are needed, respectively, to represent them (the number of bits for the DC components is not counted); and the reconstructed pixel blocks are shown as follows:

$$\begin{bmatrix} * & * & * & * & * & * & * & * \\ * & * & * & * & * & * & * & * \\ 39 & * & * & * & * & * & * & * \\ 38 & 39 & 38 & * & * & * & * & * \\ 36 & 37 & 38 & 38 & 37 & * & * & * \\ 35 & 36 & 37 & 40 & 41 & 36 & 36 & * \\ 35 & 35 & 35 & 39 & 42 & 44 & 45 & 42 \\ 35 & 35 & 34 & 34 & 32 & 35 & 36 & 38 \end{bmatrix}$$ and $$\begin{bmatrix} * & * & * & * & * & * & * & * \\ * & * & * & * & * & * & * & * \\ 36 & * & * & * & * & * & * & * \\ 37 & 36 & 37 & * & * & * & * & * \\ 39 & 39 & 39 & 37 & 38 & * & * & * \\ 38 & 38 & 39 & 40 & 41 & 39 & 39 & * \\ 33 & 34 & 34 & 39 & 40 & 42 & 42 & 41 \\ 32 & 32 & 33 & 33 & 34 & 36 & 37 & 37 \end{bmatrix}$$

Comparing them with the original block, we can calculate that the corresponding PSNR's are 39.64 dB and 39.34 dB, respectively.

In practical applications, either the number of bits used or the resulting mean-squared-error (MSE) can serve as the criterion to choose how the 2-D padding should be done for each boundary block. Alternatively, a better criterion is to use the product of these two measures. Notice that this extra degree of freedom is not supported in the standard SA-DCT, the EI method, and the LPE of MPEG-4. For the purpose of a comparison, these three schemes (where the column direction is chosen first in SA-DCT and EI) will needed 14, 13, and 13 bits, respectively, for the above example; while the resulting PSNR's are 38.30, 38.71, and 38.01 dB, respectively.

As a final remark, we point out that the original pixel values (or the DCT elements after the processing along the first direction) remain unchanged after the padding procedure. Therefore, in the decoder side, no extra computation is required other than an inverse DCT, because we know exactly where to pick up the data once the segment contour information is provided. Notice that this is sharply in contrast to the EI method where an extra matrix multiplication (as de-padding) has to be performed to restore the original data even after the decoding. Meanwhile, note that no padding is needed if one column or row is empty, i.e., K=0; while the padding for K=1 requires no computation other than just repeating the available pixel value. This also provides some advantages over the EI method as well as the padding technique suggested in MPEG-4.

C. Column versus Row: Which One First

As mentioned above, one can choose to do either the column-wise or row-wise padding in the first step, and the other direction follows. Which direction goes first will obviously influence the overall performance of the encoder to a certain extent or sometimes even to a great extent. Thus, it is important to decide the priority of these two directions.

We propose to do the priority selection as follows. For each boundary block, we first implement both combinations, i.e., (1) column-first and (2) row-first. During the implementation, we count how many bits have been used for each case. Finally, the priority is given to the combination that needs less bits.

To see this procedure for a real boundary block, let's consider the above example again (JPEG quantization table with Q=1.0 is used) and assume that the second directional processing is performed in the DCT domain: the column-first needs 20 bits (with PSNR=39.64 dB) while the row-first needs 35 bits (with PSNR=37.83 dB). Therefore, the column direction is chosen first. If the second directional padding is done in the pixel domain, the column-first needs 13 bits (with PSNR=39.34 dB) while the row-first needs 26 bits (with PSNR=39.15 dB). Again, the column direction should be chosen first.

However, choosing the first direction merely according to the number of bits used cannot guarantee the smallest coding error. A better way is again to take into account both the number of bits used and the coding error (measured in MSE). In our simulations, we found that the product of these two measures serves as a very good criterion. It is thus being employed in all experimental results that will be reported later.

Finally, note that the standard SA-DCT and EI method could both be varied to support this freedom of choosing the first processing direction. However, it is suggested in Lee "A new coding algorithm for arbitrarily shaped image segments" (by J.-W. Yi, S.-J. Cho, W.-J. Kim, S.-D. Kim, and S.-J. Lee, in Signal Processing: Image Communication, vol. 12, no. 3, June, 1998, pp. 231–242) that, in each block, the variance of the lengths of all lines in the horizontal or vertical direction is first computed, respectively; and the priority is then given to the direction that yields the smaller variance. This does not guarantee the optimal selection. In our simulations, we also apply the criterion presented above to select the first processing direction in the standard SA-DCT and EI method. On the other hand, the LPE of MPEG-4, once again, does not support this degree of freedom.

IV. Computational Complexity Analysis

To analyze the computational complexity of our algorithm and then compare it against other algorithms, we estimate the number of multiplications and additions needed per boundary block. It is clear that this computational complexity is dependent on the dimension of each column/row vector in a boundary block, which ranges from 0 to N. To facilitate the analysis, we need to make the following assumption (which sounds reasonable): the vector dimension is uniformly distributed, i.e., it is equally probable that an input vector has a dimension K where $0 \leq K \leq N$.

Normal implementation of the base-K (for an arbitrary K) DCT requires $K^2$ multiplications and $K(K-1)$ additions. There are a number of fast algorithms (e.g. B. C. Lee, "A new algorithm to compute the discrete cosine transform," IEEE Trans. Acoustics, Speech, and Signal Processing, vol. ASSP-32, no. 6, December 1984, pp. 1243–1245) to implement the base-N DCT when N is a positive integer power of 2. In our implementation, we adopt Lee's fast DCT algorithm.

During the complexity analysis, whenever the input vector length is a positive integer power of 2, the fast algorithm is used. It is important to note that arbitrarily-lengthed DCT kernels also have some symmetric properties which can be utilized to accelerate the transform. In fact, a fast SA-DCT (for N=8) has been implemented in "Experimental results on a fast SA-DCT Implementation" (by P. Kauff, K. Schuur and M. Zhou in ISO/IEC JTC1/SC29WG11, MPEG98/3569, Dublin, July 1998) to fully exploit the symmetries within the kernel functions. On the other hand, our padding matrices also have some nice properties which can accelerate the implementation: (1) each row of every padding matrices sums up to 1, and (2) there exist symmetric (sum equal to 0) or complement (sum equal to 1) properties between two columns of some padding matrices.

Table 1 summarizes the complexities of different shape adaptive DCT algorithms for N=8. The fast SA-DCT algorithm referred to above is labelled F-SA-DCT in table 1. Notice that both forward and inverse transforms are required at the encoder. Here are some observations:

1. The EI method has the highest complexity. This is because that, at encoder, it needs to generate a number of N new pixel values no matter how long each row or column is; and at decoder, it has to perform the de-padding in addition to the normal IDCT.
2. MPEG4-LPE seems to have a complexity lower than SA-DCT, EI, and the present embodiment, at both the encoder and the decoder. This conclusion is drawn based on an assumption that the number of multiplications is dominant when measuring the complexity. However, as will be demonstrated later in the experimental part, MPEG4-LPE gives a rather poor rate-distortion performance as compared with other methods.
3. The embodiment of the present invention seems to be slightly/significantly better in terms of complexity than SA-DCT at the encoder/decoder. Again, this is drawn based on counting the numbers of multiplications needed in both methods.
4. The fast SA-DCT seems to be the best in terms of complexity at both encoder and decoder. However, the situation would be different when considering hardware implementation. In implementing the fast SA-DCT, the chip design has to include both the fast SA-DCT and the normal DCT of size 8×8. Therefore, the total number of multiplications/additions to be implemented has increased dramatically. On the other hand, the embodiment can utilize the available 8×8 DCT chip directly for both regular blocks and boundary blocks. For each boundary block, the extra computations due to the padding are just 56 multiplications and 12 additions on average, which are much less than the corresponding numbers in the fast SA-DCT algorithm.
5. It is clear that the encoding and decoding are symmetric in terms of complexity within SA-DCT and EI (when the inverse transform is not counted at encoder). In the meanwhile, our new algorithm exhibits a nice asymmetric property: the computations needed at the decoder are nothing more than an inverse DCT of the normal size N×N, whereas all computations associated with the padding that are needed at the encoder have now been waived.

Therefore, our proposed algorithm provides a good solution to asymmetric applications.

|  | Encoder | | Decoder | |
| --- | --- | --- | --- | --- |
|  | No. of multiplications | Number of additions | Number of multiplications | Number of additions |
| SA-DCT | 548 | 558 | 274 | 279 |
| F-SA-DCT | 248 | 384 | 124 | 192 |
| EI | 1280 | 1600 | 640 | 800 |
| MPEG4-LPE | 416 | 1040 | 192 | 464 |
| Embodiment | 472 | 1052 | 192 | 464 |

Although the overall computation requirement (for software implementation) for the embodiment is higher than that of F-SA-DCT algorithm for N=8, we have observed that when the input vector length K equals to 7, the embodiment is more efficient than F-SA-DCT: our algorithm requires only 15 multiplications while the corresponding number for F-SA-DCT is 20.

It is expected that for a larger N (e.g. 16), as K gets larger, the embodiment would have a much higher chance to outperform F-SA-DCT since the saving from the fast base-N DCT will dominate. In fact, as the image/video resolution gets higher and higher (in HDTV/super-HDVT or printing industry), the correlation between pixels will increase very much. It is therefore possible that a larger N (still an integer power of 2) would be chosen under such circumstances so as to yield a greater coding gain.

V. Experimental Results

MPEG-4 provides a great deal of functionality and is much more complex than any previous image and video coding standards. Since our intention here is to provide a good substitution to the standard SA-DCT so as to utilize all available computationally efficient algorithms (for software implementation) or DCT chipsets (for hardware implementation), we use the JPEG standard as the benchmark to highlight the proposed algorithm. In fact, every I-VOP in MPEG-4 is coded through the same procedure as in JPEG.

Figure 2A:
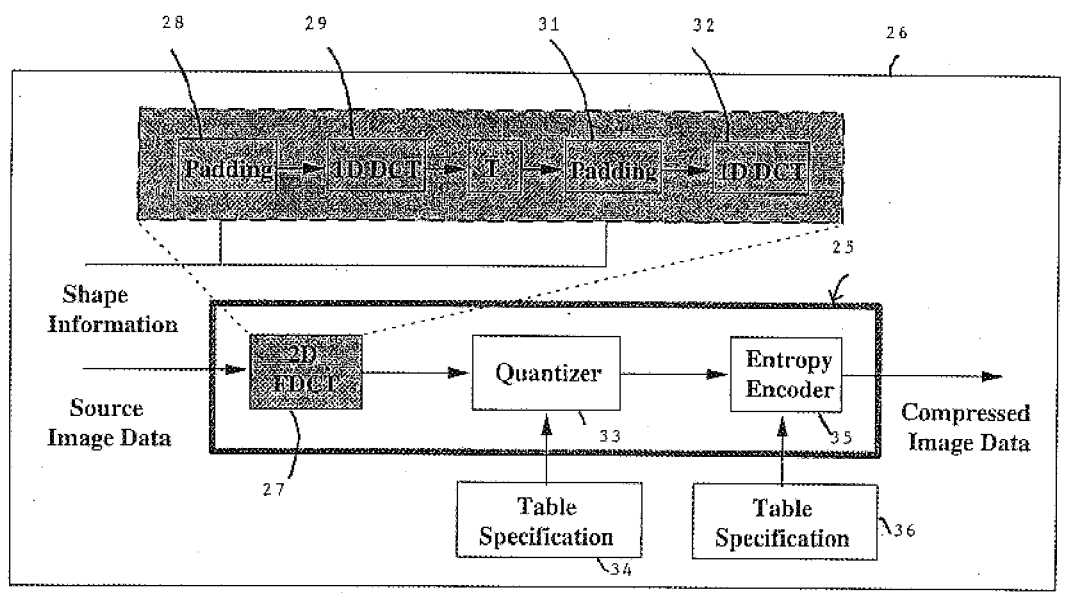
FIG. 2, which is composed of 2(a) and 2(b) shows (a) Flow chart of a JPEG encoder according to the invention, and (b) a flow chart of JPEG decoder according to the invention.
Figure 2B:
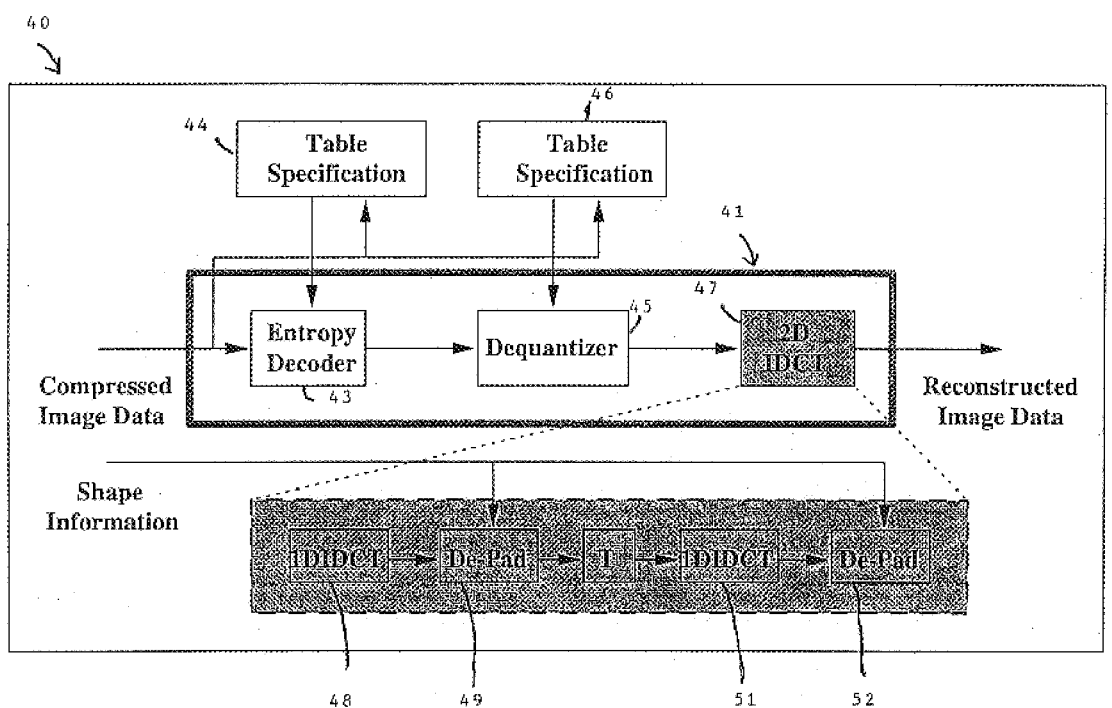

To accommodate the proposed padding technique into the JPEG procedure, we replaced the 2-D FDCT block in the original encoder flow chart by another functional DCT block, as shown in FIG. 2($a$), while the corresponding replacement is made in the decoder flow chart, as illustrated in FIG. 2($b$).

Specifically, FIG. 2($a$) shows an encoder 25 included in an image processing apparatus 26. The encoder 25 receives source image data to be encoded. The encoder 26 includes a unit 27 which performs a method according to the invention as described above with reference to FIG. 1, of vertical (or horizontal) padding 28, a vertical (or horizontal) DCT 29, to give an image "T" (corresponding to FIG. 1($c$)), horizontal (or vertical) padding 31, and a horizontal (or vertical) DCT 32. The encoder further includes known components including a quantizer 33 using data stored in a table specification 34, an an entropy encoder 35 using data stored in a table specification 36. The output of encoder 25 is compressed image data.

Similarly, FIG. 2($b$) shows an decoder 41 included in an image processing apparatus 40. The decoder 41 receives compressed image data to be decoded. The encoder includes known components including an entropy decoder 43 using data associated with the compressed data and stored in a table specification 44, a dequantizer 45 using data associated with the compressed data and stored in a table specification 46. The decoder 41 includes a unit 47 which performs a method of inverse horizontal (or vertical) DCT 48, de-padding 49 in the horizontal (vertical) direction, to give an image "T" corresponding to FIG. 1($c$), a vertical (or horizontal) inverse DCT 51, and a vertical (or horizontal) depadding 52, to give the output of decoder 41, namely reconstructed image data.

All experiments were performed on some typical frames taken from various classes of the commonly used MPEG-4 video sequences (see the publication of the MPEG Requirements Subgroup, "Overview of MPEG-4 profile and level definitions", ISO/IEC JTC1/SC29WG11, MPEG98/N2458}, October 1998, Atlantic City), such as "Akiyo", "News" (Class-B), "Bream", "Children", and "Weather" (all belonging to Class-E).

We observed that in all cases the embodiment clearly outperforms the normal 8×8 DCT with MPEG-4 LPE padding (denoted as MPEG4-LPE) and provides very comparable performance as the standard SA-DCT and the EI method (denoted as EI). Notice that the optimal selection for the first processing direction has been performed in the embodiment, SA-DCT, and EI. Some of the simulations are reported in the following.

Figure 3A:
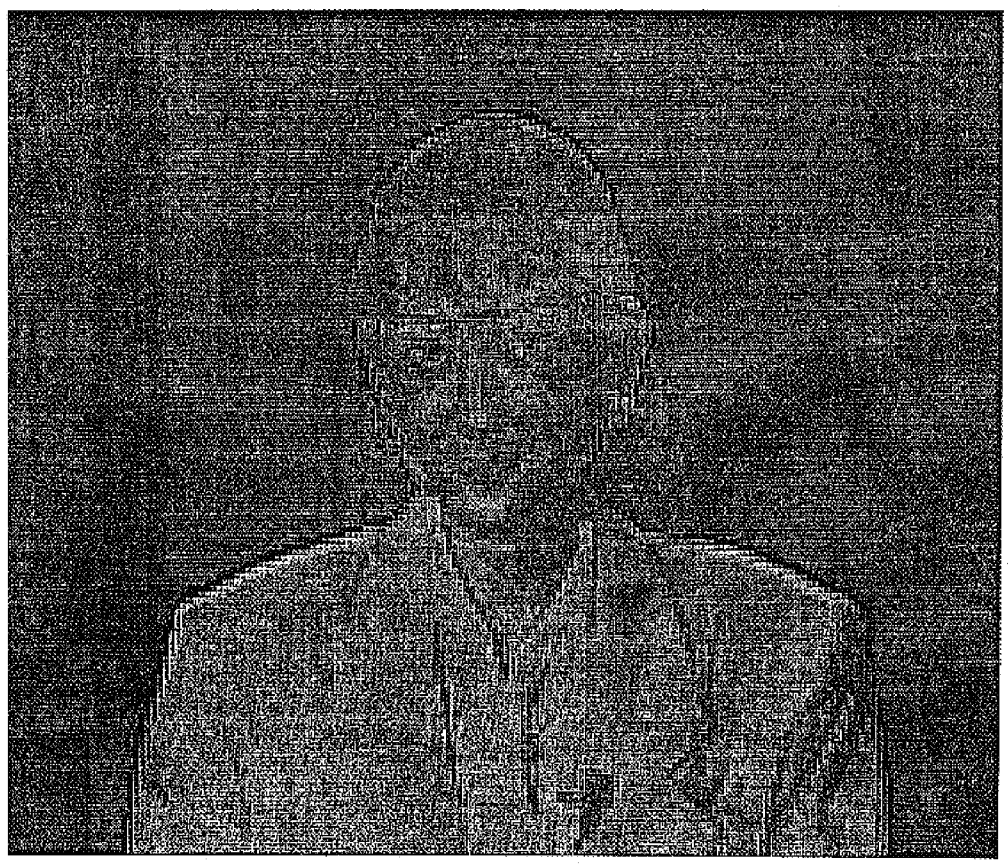
FIGS. 3(a)–(b) shows a first VOP of the "Akiyo" sequence as (a) a video object and (b) the corresponding shape.
Figure 3B:
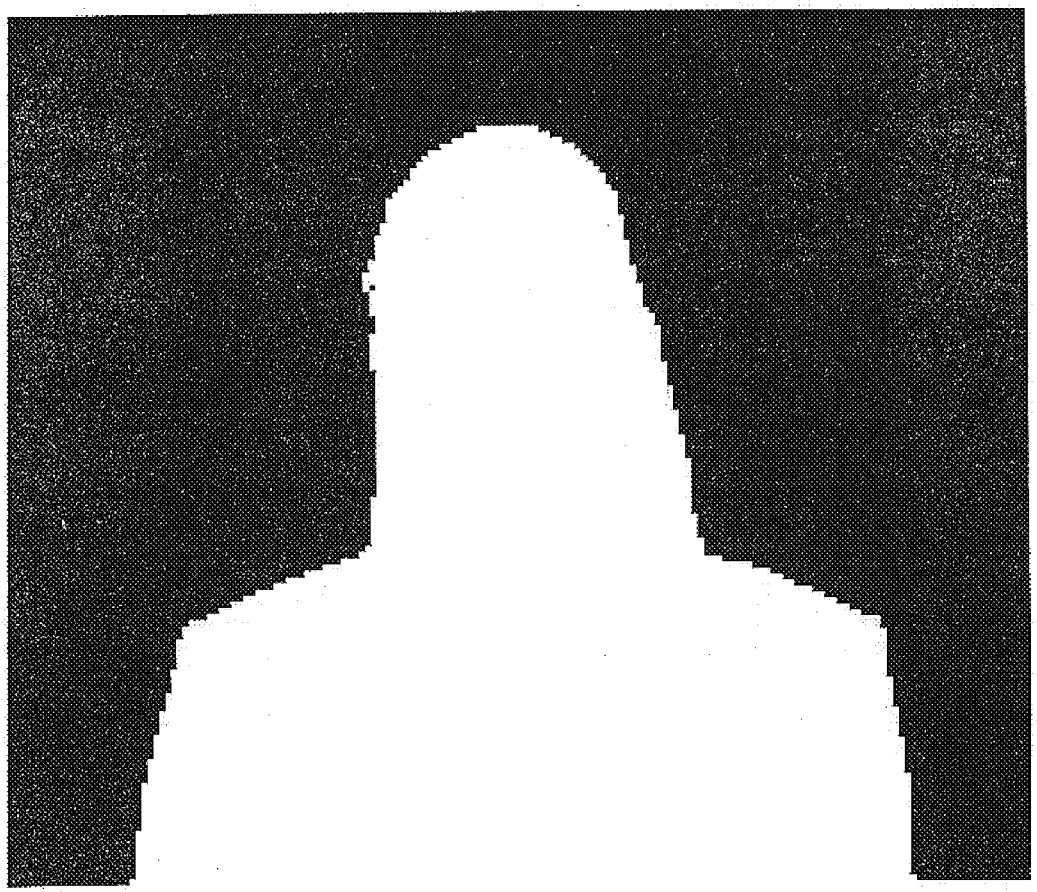
Figure 4:
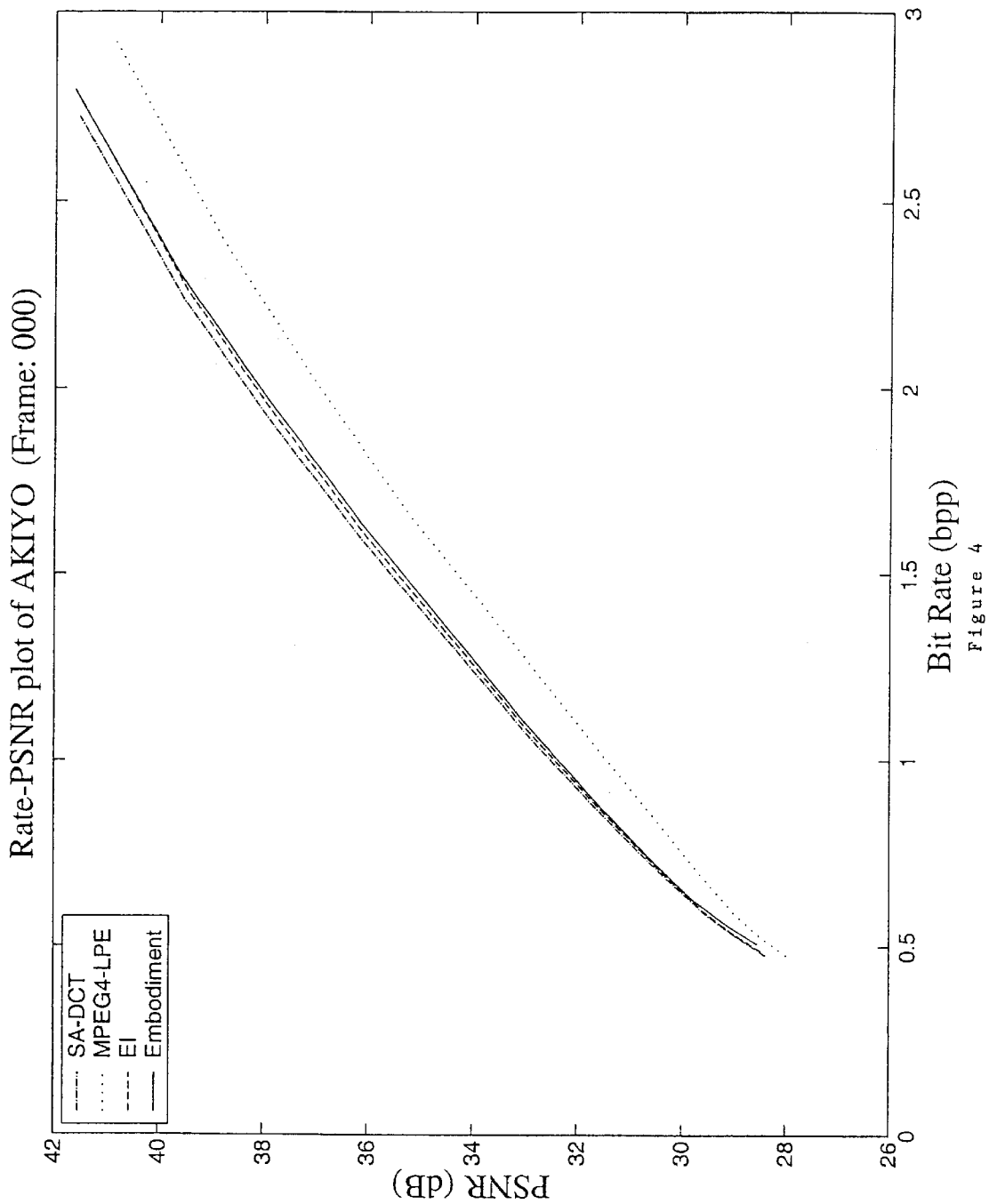
FIG. 4 shows rate-PSNR plots for the first VOP of Akiyo in FIG. 3.

FIG. 3($a$) shows the original image and FIG. 3($b$) the collateral shape of Akiyo which is the first VOP of the standard video sequence "Akiyo" (which belongs to class-A as specified in MPEG-4). FIG. 4 shows the rate-PSNR (peak signal to noise ratio) results obtained from the standard SA-DCT, the MPEG-4 LPE padding, the EI method, and our proposed algorithm. The second directional processing is done in the DCT domain so as to have a fair comparison with other algorithms (in fact, we have recently obtained some encouraging results by an adaptive domain selection for each boundary block).

From the figure, we see that our proposed method clearly outperforms MPEG4-LPE and is very comparable with SA-DCT and EI in the bit-rate range of interest.

Figure 5A:
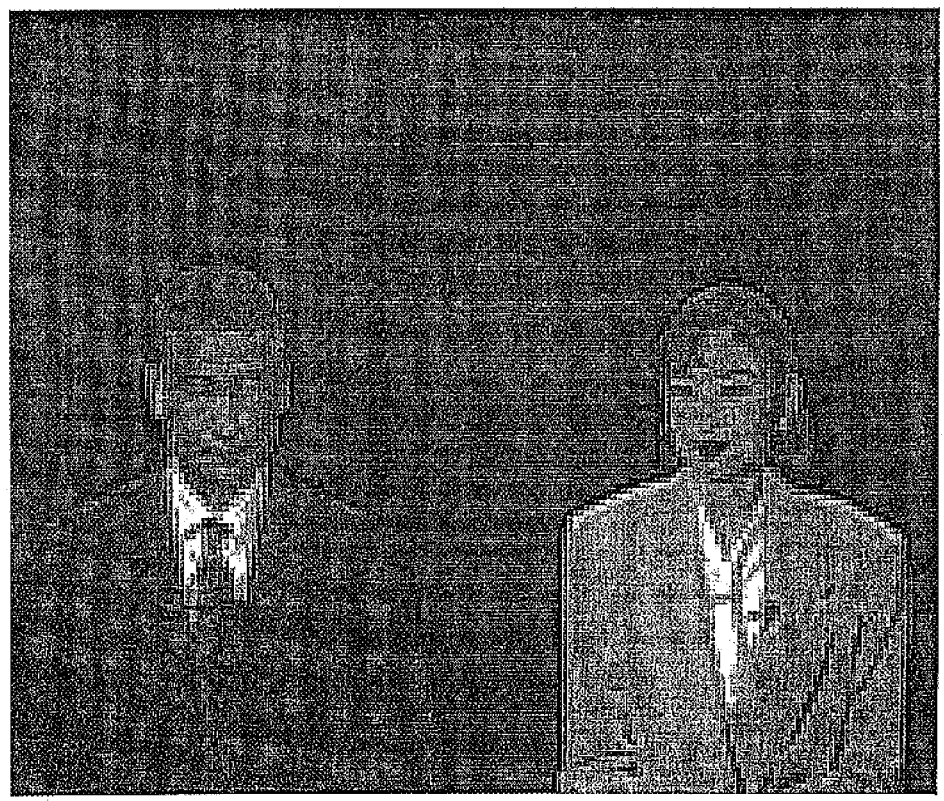
FIG. 5 shows a first VOP of the "News" sequence as (a) a video object and (b) the corresponding shape.
Figure 5B:
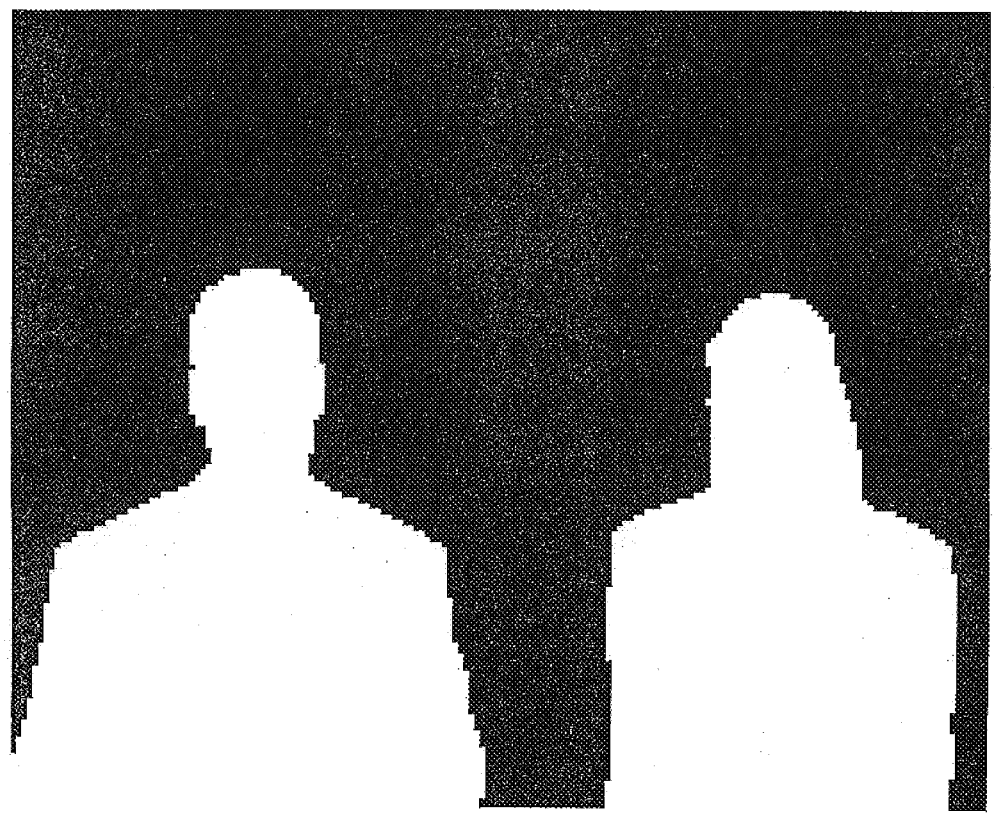
Figure 6:
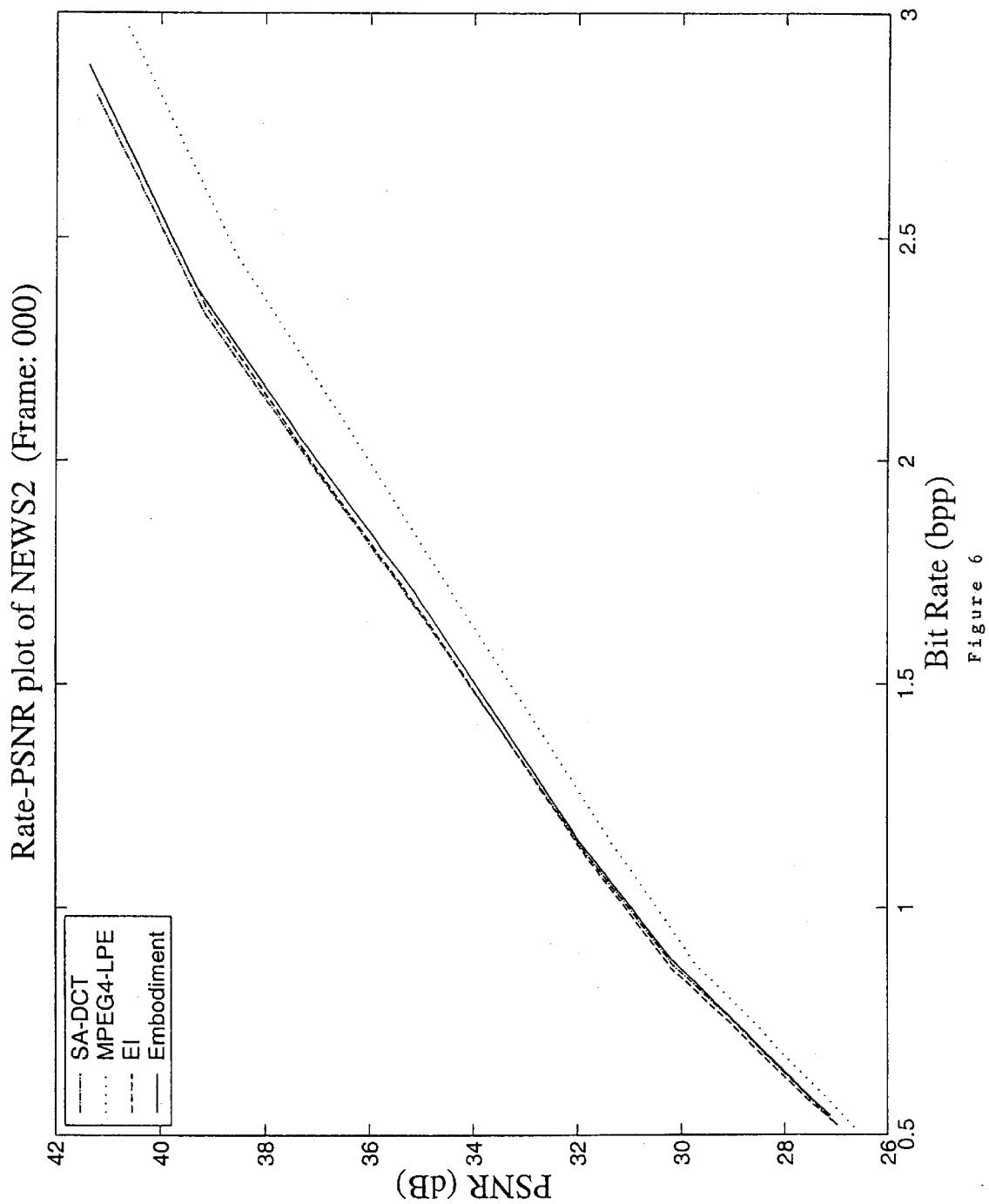
FIG. 6 shows rate-PSNR plots for the first VOP of News in FIG. 5.

In the second experiment, the original image shown in FIG. 5($a$) is taken from another standard MPEG-4 video sequence "News" (Class-B). The collateral shape is shown in FIG. 5($b$). The coding results by using the various methods are shown in FIG. 6. Again, the same conclusion as for the previous example can be made.

Figure 7:
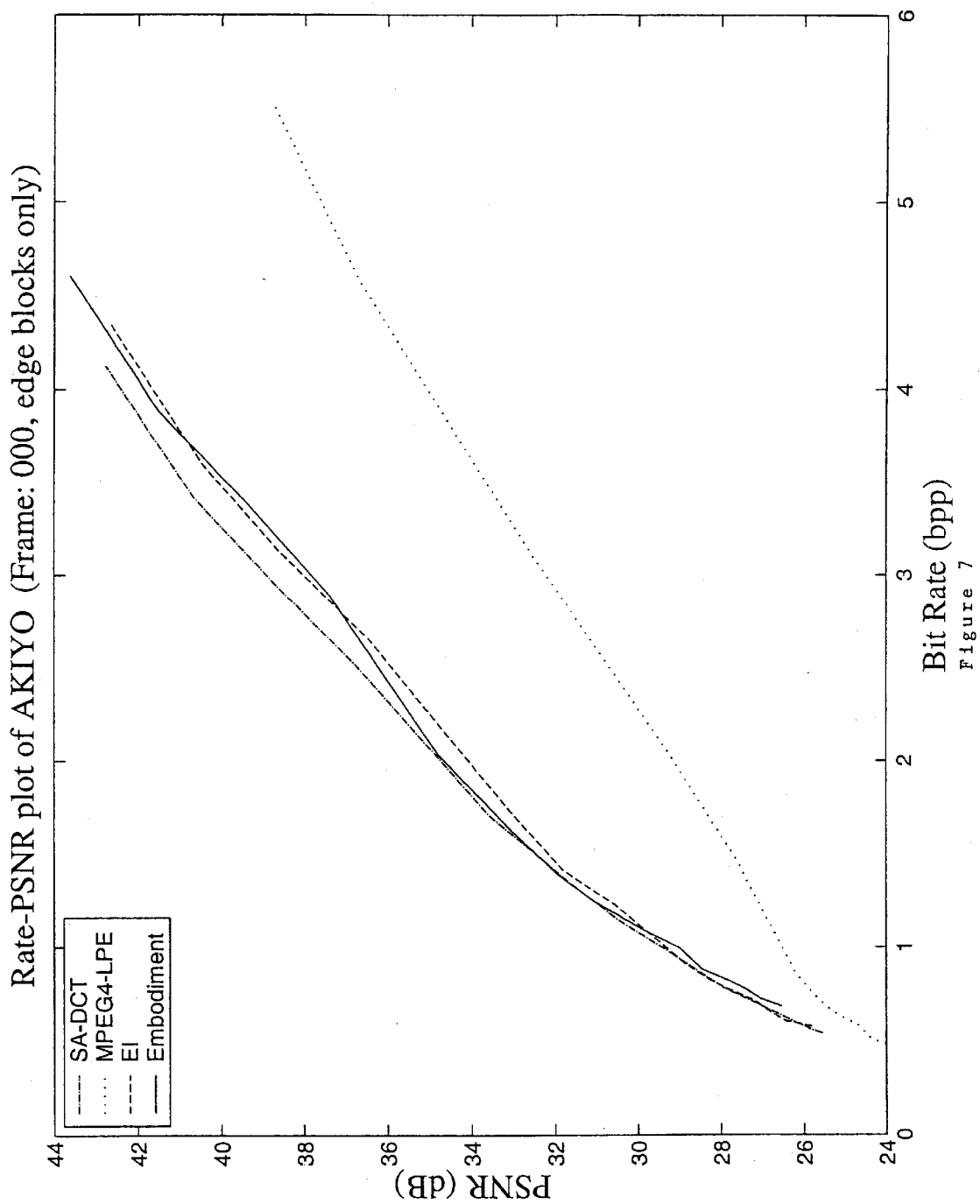
FIG. 7 shows rate-PSNR plots for coding only boundary blocks of the first VOP of Akiyo.
Figure 8:
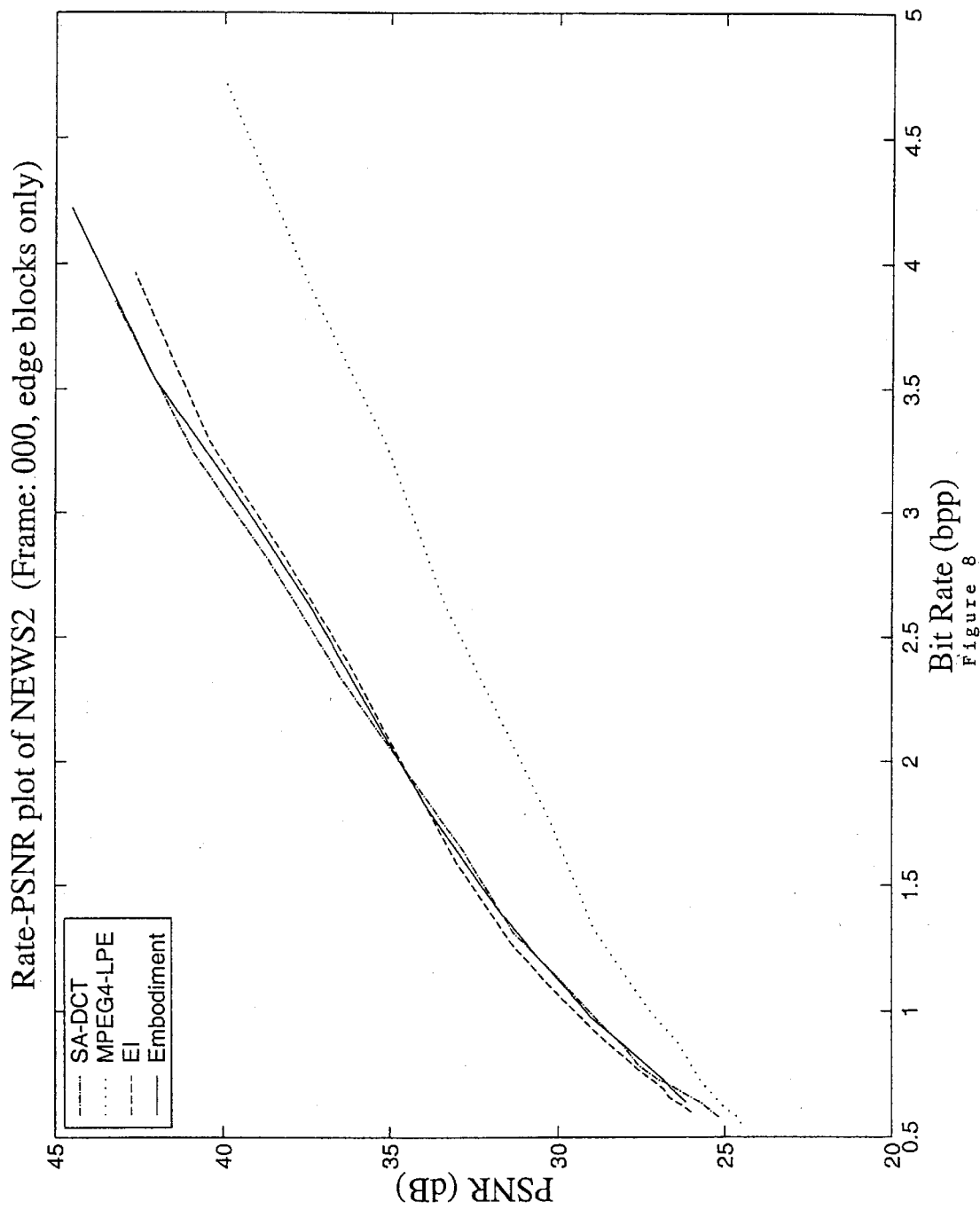
FIG. 8 shows rate-PSNR plots for coding only boundary blocks of the first VOP of News.

Another remark that is worthy of pointing out is that the bit rate for the pixels in boundary blocks is usually higher than that for other pixels in inner blocks of an object. To confirm this point, we performed experiments that encode boundary blocks only. Some results are illustrated in FIGS. 7 and 8. It is seen from them that the bit rate for pixels inside boundary blocks are on average higher than that for inner blocks for the same PSNR. It is also seen that SA-DCT, EI, and our proposed method are performing very much the same, while they all provide a bigger improvement over MPEG4-LPE when comparing with the results shown in FIGS. 4 and 6.

Figure 9A:
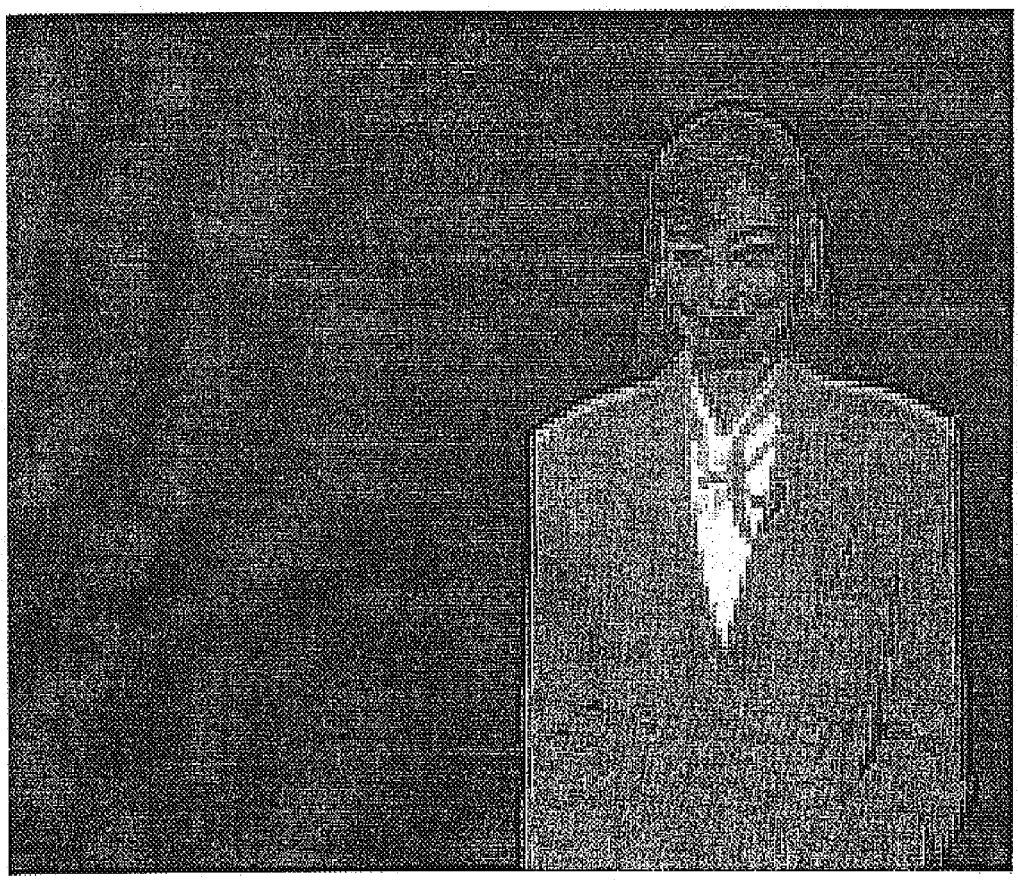
FIGS. 9(a)–(b) shows the first VOP of the "Weather" sequence as (a) a video object and (b) the corresponding shape.
Figure 9B:
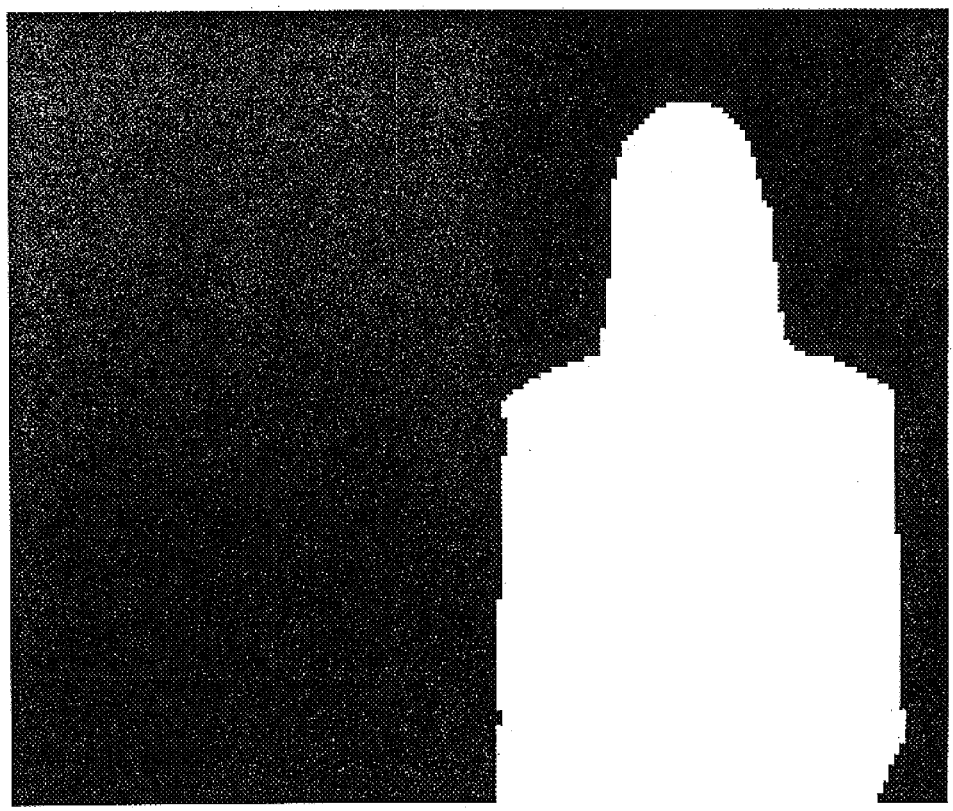
Figure 10:
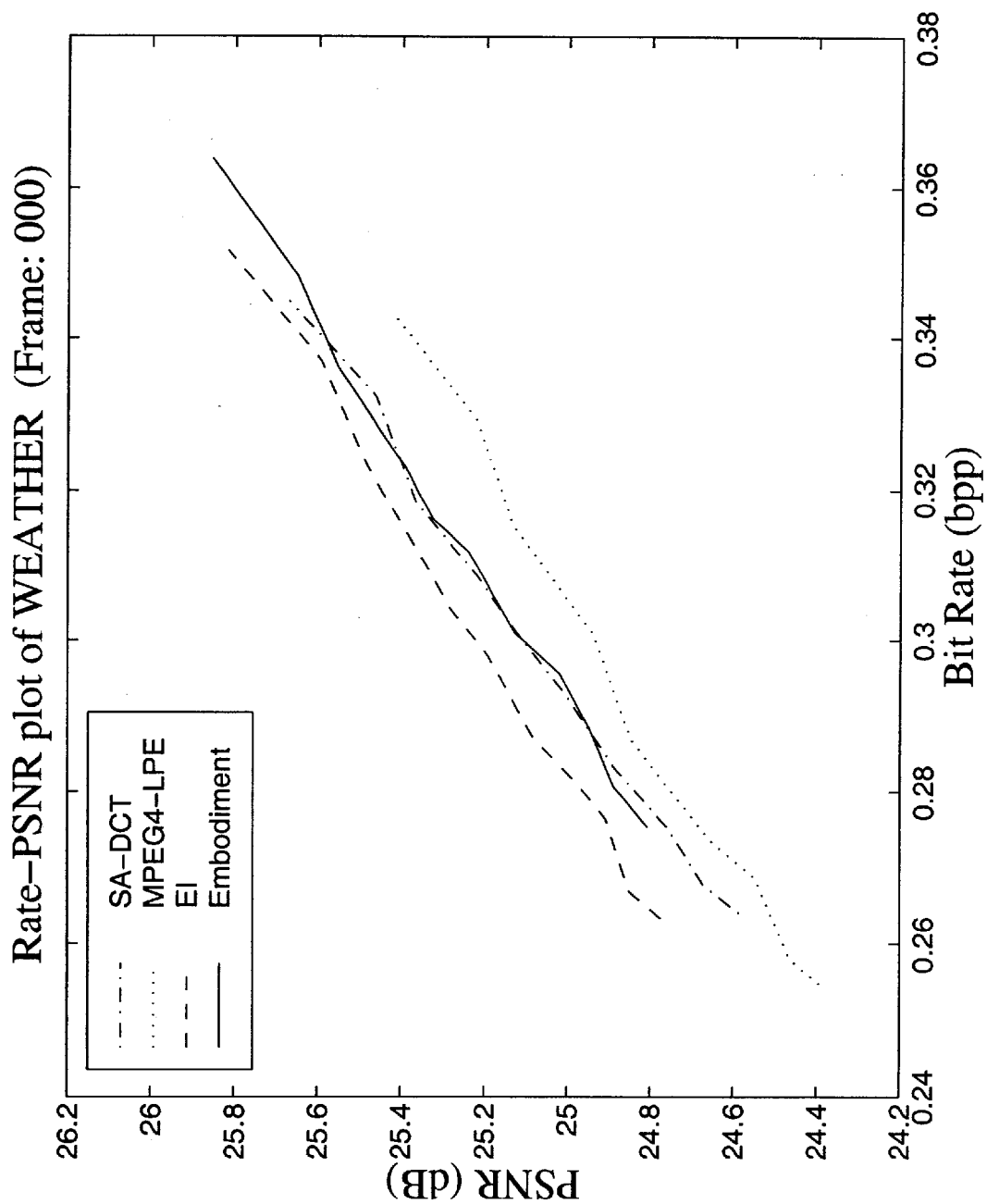
FIG. 10 shows rate-PSNR plots for the first VOP of "Weather" at low bit rates.

When the bit rate decreases, the difference among the various methods tapers off. FIG. 9($a$) shows a frame taken from the standard MPEG-4 video sequence Weather (class-E) and FIG. 9($b$) shows its collateral shape; while FIG. 10 shows the rate-PSNR results. It is seen that our proposed algorithm is still better than MPEG4-LPE, nearly the same as EI, and slightly worse than SA-DCT.

Although the invention has been described above in relation to particular embodiments, a number of variations are possible within the scope of the invention as will be clear to a skilled person. For example, it is possible to adapt the padding method to ensure that the energy distribution among DCT elements is in favor of quantization.

Additionally, the 2-D padding described need not be performed in two steps, but in one-step such that, after normal 2-D DCT on the padded block, there are as many zeros as possible in the high frequency positions along the zig-zag scanning. Similarly, hybrids are possible between the padding-based DCT and F-SA-DCT so as to minimize the computation demand. Similarly, DCT may be replaced by other orthogonal transforms.

Although the invention has been explained above with reference only to particular embodiments, the invention is not limited in this respect, and the scope of the invention is to be understood from the scope and spirit of the appended claims. In particular, the invention encompasses a case in which the padding is performed on a 2-D matrix treated as a whole, rather than being decomposed into vectors representing rows or columns.

Appendix

According to the strategy presented in Part A of Section III, we have done the exhaustive search for the case N=8. The following interlacing positions (denoted as $Pos_i$ where i stands for the input vector's length) are found to be optimal:

| | | | | | | |
|---|---|---|---|---|---|---|
| $Pos_2$: | 1 | 3 | 4 | 5 | 6 | 8 |
| $Pos_3$: | 2 | 3 | 5 | 6 | 8 | |
| $Pos_4$: | 2 | 4 | 6 | 7 | | |
| $Pos_5$: | 2 | 4 | 6 | | | |
| $Pos_6$: | 3 | 6 | | | | |
| $Pos_7$: | 5 | | | | | |

For instance, one needs to generate three new values if i=5 and, according to $Pos_5$, these three values will be placed at the 2nd, 4th, and 6th positions in the padded vector (of length 8).

Based on the optimal orderings, we found the associated matrix $P = -C_{11}^{-1}C_{10}$ for i=2,3, . . . , 7, as given below:

$P_2 =$

| | |
|---|---|
| 1.0898 | −0.0898 |
| 0.8341 | 0.1659 |
| 0.6173 | 0.3827 |
| 0.3827 | 0.6173 |
| 0.1659 | 0.8341 |
| −0.0898 | 1.0898 |

$P_3 =$

| | | |
|---|---|---|
| 0.7432 | 0.3079 | −0.0511 |
| 0.3512 | 0.7312 | −0.0824 |
| −0.1744 | 0.9278 | 0.2466 |
| −0.1455 | 0.5255 | 0.6199 |
| 0.1233 | −0.3631 | 1.2398 |

$P_4 =$

| | | | |
|---|---|---|---|
| 0.5233 | 0.5665 | −0.1077 | 0.0179 |
| −0.1686 | 0.7351 | 0.4802 | −0.0467 |
| 0.1737 | −0.4802 | 1.0467 | 0.2599 |
| 0.1344 | −0.3512 | 0.5412 | 0.6756 |

$P_5 =$

| | | | | |
|---|---|---|---|---|
| 0.4802 | 0.6791 | −0.2813 | 0.3209 | −0.1989 |
| −0.0955 | 0.5440 | 0.7747 | −0.5440 | 0.3209 |
| 0.0264 | −0.0955 | 0.4538 | 1.0955 | −0.4802 |

$P_6 =$

| | | | | | |
|---|---|---|---|---|---|
| −0.3244 | 0.8341 | 0.7969 | −0.3827 | 0.1659 | −0.0898 |
| −0.0898 | 0.1659 | −0.3827 | 0.7969 | 0.8341 | −0.3244 |

$P_7 =$

| | | | | | | |
|---|---|---|---|---|---|---|
| −0.1989 | 0.5665 | −0.8478 | 1 | 0.8478 | −0.5665 | 0.1989 |

What is claimed is:

1. A method of encoding an image object consisting of pixel values at each of a plurality of pixel locations in a pixel array, the array being divided into a plurality of blocks of size N×N, at least one of said blocks being a boundary block including both at least one pixel of said image object and at least one further pixel, the method including for each boundary block:

(i) deriving K object elements which are respectively the pixel values of K pixels of the image object within the boundary block spaced along a first direction;

(ii) employing said K object elements to obtain (N−K) padding elements;

(iii) deriving a padded vector consisting of said K object elements and said (N−K) padding elements, and (iv) transforming the padded vector using a predetermined N×N transform matrix to produce a transformed vector, wherein said transformed vector has (N−K) elements in (N−K) predetermined transform locations which are zero.

2. A method according to claim 1 in which said transform matrix produces a discrete Fourier transform, and said (N−K) transform locations are the locations of the transformed vector which represent the (N−K) components of highest spatial frequency in the first direction.

3. A method according to claim 1 in which said (N−K) padding elements are at (N−K) respective padding locations in said padded vector, said locations being selected based on the value of K.

4. A method according to claim 3 in which said (N−K) padding locations are chosen to minimise the value of the $L_2$-norm of a K×K matrix K which relates a vector u consisting of the K pixel values of the input object and a vector U consisting of the K non-zero elements of the transformed vector according to the expression U=K.u.

5. A method according to claim 3 in which said (N−K) padding locations are chosen in dependence upon the determinant of a (N−K)×(N−K) matrix $C_{11}$ defined by $$C_{11} = \begin{bmatrix} c(\hat{\beta}_0, \beta_0) & \cdots & c(\hat{\beta}_0, \beta_{N-1-K}) \\ \vdots & \ddots & \vdots \\ c(\hat{\beta}_{N-1-k}, \beta_0) & \cdots & c(\hat{\beta}_{N-1-K}, \beta_{N-1-K}) \end{bmatrix}$$

where the padding locations are at positions $\beta_0, \ldots, \beta_{N-1-K}$, where $0 \leq \beta_0, \ldots, \beta_{N-1-K} \leq N-1$, $$c(p, q) = \sqrt{\frac{2}{N}} c_p \cos \frac{p(2q+1)\pi}{2N}, \quad \text{and}$$

$c_p = \sqrt{1/2}$ if p=0 and $c_p=1$ otherwise.

6. A method according to claim 3 in which said (N−K) padding locations are chosen in dependence upon the condition number of a (N−K)×(N−K) matrix $C_{11}$ defined by $$C_{11} = \begin{bmatrix} c(\hat{\beta}_0, \beta_0) & \cdots & c(\hat{\beta}_0, \beta_{N-1-K}) \\ \vdots & \ddots & \vdots \\ c(\hat{\beta}_{N-1-k}, \beta_0) & \cdots & c(\hat{\beta}_{N-1-K}, \beta_{N-1-K}) \end{bmatrix}$$

where the padding locations are at positions $\beta_0, \ldots, \beta_{N-1-K}$, where $0 \leq \beta_0, \ldots, \beta_{N-1-K} \leq N-1$, $$c(p,q) = \sqrt{\frac{2}{N}}\, c_p \cos\frac{p(2q+1)\pi}{2N}, \quad \text{and}$$

$c_p = \sqrt{1/2}$ if $c_p = 1$ otherwise.

7. A method according to claim 3 in which said (N−K) padding locations are chosen in dependence upon ratio of the maximum and minimum eigenvalues of a (N−k)×(N−k) matrix $C_{11}$ defined by $$C_{11} = \begin{bmatrix} c(\beta_0, \beta_0) & \cdots & c(\beta_0, \beta_{N-1-K}) \\ \vdots & \ddots & \vdots \\ c(\beta_{N-1-k}, \beta_0) & \cdots & c(\beta_{N-1-K}, \beta_{N-1-K}) \end{bmatrix}$$

where the padding locations are at positions $\beta_0, \ldots, \beta_{N-1-K}$, where $0 \leq \beta_0, \ldots, \beta_{N-1-k} \leq N-1$, $$c(p,q) = \sqrt{\frac{2}{N}}\, c_p \cos\frac{p(2q+1)\pi}{2N}, \quad \text{and}$$

$c_p = \sqrt{1/2}$ if $p=0$ and $c_p = 1$ otherwise.

8. A method according to claim 1 in which the transformed vector is transmitted together with information identifying the locations of the pixels of the image object within the boundary block.

9. A computer-readable medium storing computer-executable programming for causing a processor to perform a method according to claim 1.

10. A method of encoding an image object consisting of pixel values at each of a plurality of pixel locations in a pixel array, the array being divided into a plurality of blocks of size N×N, at least one of said blocks being a boundary block including both at least one image pixel which is part of said image object and at least one further pixel, the method including for each boundary block:

i) determining a plurality of sets j=1, ..., N of image pixels, the $K_j$ image pixels of each set being spaced apart in a first direction and the sets of image pixels being spaced apart in a second direction orthogonal to said first direction;

(ii) for each of the sets, employing the $K_j$ values of the image pixels and a predetermined N×N transform matrix to produce a transformed vector representing spatial frequencies in the first direction, wherein each said transformed vector has (N−$K_j$) elements in (N−$K_j$) predetermined transform locations which are zero; and (iii) employing the elements plurality of transformed vectors and a predetermined N×N transform matrix which generates a transform in the second direction, to produce an array of transformed values having a number of non-zero elements equal to the number of image pixels in the boundary block.

11. A computer-readable medium storing computer-executable programming for causing a processor to perform a method according to claim 10.

12. A method of encoding an image object consisting of pixel values at each of a plurality of pixel locations in a pixel array, the array being divided into a plurality of blocks of size N×N, at least one of said blocks being a boundary block including both at least one image pixel which is part of said image object and at least one further pixel, the method including for each boundary block:

(i) padding the boundary block in a first direction to form a first padded block, carrying out a spatial frequency transform of the first padded block in the first direction using a first predetermined N×N transform matrix to derive a first transformed block, padding the first transformed block in a second direction orthogonal to the first direction to derive a second padded block, and carrying out a spatial frequency transform of the second padded block in the second direction using a second predetermined N×N transform matrix to derive a second transformed block;

ii) padding the first padded block in the second direction to derive a third padded block, carrying out a spatial frequency transform of the third padded block in the first direction using the first predetermined N×N transform matrix to derive a third transformed block, and carrying out a spatial frequency transform of the third transformed block in the second direction using the second predetermined N×N transform matrix to derive a fourth transformed block; and (iii) selecting one of the second and fourth transformed blocks according to a predetermined criterion.

13. A computer-readable medium storing computer-executable programming for causing a processor to perform a method according to claim 12.

14. A method of encoding an image object consisting of pixel values at each of a plurality of pixel locations in a pixel array, the array having rows in a first direction and columns in a second direction orthogonal to the first direction, the array being divided into a plurality of blocks of size N×N, at least one of said blocks being a boundary block including both at least one image pixel which is part of said image object and at least one further pixel, the method including for each boundary block:

(i) padding the rows of the boundary block, and subsequently using the padded image and two predetermined transform matrices which respectively represent spatial frequency transforms in the first and second directions, to derive a first array;

(ii) padding the columns of the boundary block, and subsequently using the padded image and said two predetermined transform matrices to derive a second array; and (iii) selecting one of the first and second arrays according to a predetermined criterion.

15. A computer-readable medium storing computer-executable programming for causing a processor to perform a method according to claim 14.

16. A method of encoding an image object consisting of pixel values at each of a plurality of pixel locations in a pixel array, the array being divided into a plurality of blocks of size N×N, at least one of said blocks being a boundary block including both at least one image pixel which is part of said image object and at least one further pixel, the method including for each boundary block:

(i) determining N sets j=1, ..., N of image pixels, the $K_j$ image pixels of each i-th set being spaced apart in a first direction and the sets of image pixels being spaced apart in a second direction orthogonal to said first direction;

(ii) for each set of image pixels, deriving a respective N-vector consisting of $K_j$ object elements which are respectively the values of the $K_j$ image pixels, and (N−$K_j$) padding elements, and (iii) transforming each said padded vector using a predetermined N×N Fourier transform matrix which produces a spatial frequency transform in said first direction, (iv) deriving N sets, k=1, ..., N of transformed values, the elements of each k-th set of transformed values being the non-zero k-th elements of the transformed vectors;

(v) for any said set of transformed values having fewer than N values, increasing the number of elements to N by adding additional padding elements; and (vi) transforming each set of transformed values using a second predetermined N×N Fourier transform matrix which produces a spatial frequency transform in the second direction normal to derive a respective second transformed vector;

wherein the total number of non-zero values in the second transformed vectors is equal to the number of image pixels in said boundary block.

17. A computer-readable medium storing computer-executable programming for causing a processor to perform a method according to claim 16.

18. A method of encoding an image object consisting of pixel values at each of a plurality of pixel locations in a pixel array, the array being divided into a plurality of blocks of size N×N, at least one of said blocks being a boundary block including both at least one image pixel which is part of said image object and at least one further pixel, the method including for each boundary block:

(i) determining N first sets j=1, ..., N of values, each first set consisting of $K_j$ image values of $K_j$ image pixels of the boundary block spaced apart in a first direction;

(ii) for each first set of values, in the case that $K_j$ is greater than zero, deriving an N-vector consisting of the $K_j$ image values and $(N-K_j)$ padding elements, (iii) deriving N second sets k=1, ..., N of values, the elements of each k-th second set of values being the non-zero k-th elements of said N-vectors;

(iv) for any said second set having fewer than N values, increasing the number of elements to N by adding additional padding elements;

(v) forming an N×N array of said second sets of values;

(vi) transforming said array using a first predetermined N×N Fourier transform matrix which produces a spatial frequency transform in said first direction; and (vii) transforming said array using a second predetermined N×N Fourier transform matrix which produces a spatial frequency transform in a second direction normal to said first direction.

19. A computer-readable medium storing computer-executable programming for causing a processor to perform a method according to claim 18.

20. An apparatus for encoding an image object consisting of pixel values at each of a plurality of pixel locations in a pixel array, the array being divided into a plurality of blocks of size N×N, at least one of said blocks being a boundary block including both at least one pixel of said image object and at least one further pixel, the apparatus comprising:

(i) derivation means which, for each boundary block, derive K object elements which are respectively the pixel values of K pixels of the image object within the boundary block spaced along a first direction;

(ii) padding means which employ said K object elements to obtain (N−K) padding elements, and derive a padded vector consisting of said K object elements and said (N−K) padding elements, and (iii) transform means which transform the padded vector using a predetermined N×N transform matrix to produce a transformed vector, wherein said transformed vector has (N−K) elements in (N−K) predetermined transform locations which are zero.

* * * * *